(12) United States Patent
Kim et al.

(10) Patent No.: US 11,404,065 B2
(45) Date of Patent: Aug. 2, 2022

(54) METHOD FOR DISPLAYING VISUAL INFORMATION ASSOCIATED WITH VOICE INPUT AND ELECTRONIC DEVICE SUPPORTING THE SAME

(71) Applicant: SAMSUNG ELECTRONICS CO., LTD., Suwon-si (KR)

(72) Inventors: Jongho Kim, Suwon-si (KR); Jung Joo Sohn, Suwon-si (KR); Gunho Chae, Suwon-si (KR); Sangwoong Hwang, Suwon-si (KR); Hwanchul Kim, Suwon-si (KR); Jungkun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 92 days.

(21) Appl. No.: 16/749,454

(22) Filed: Jan. 22, 2020

(65) Prior Publication Data
US 2020/0234715 A1    Jul. 23, 2020

(30) Foreign Application Priority Data

Jan. 22, 2019  (KR) .................. 10-2019-0008362

(51) Int. Cl.
*G10L 15/22*     (2006.01)
*G10L 15/30*     (2013.01)
(Continued)

(52) U.S. Cl.
CPC .............. *G10L 15/30* (2013.01); *G10L 15/22* (2013.01); *G10L 15/26* (2013.01); *G10L 25/72* (2013.01); *G10L 2015/223* (2013.01)

(58) Field of Classification Search
CPC ......... G10L 25/72; G10L 15/22; G10L 15/30; G10L 17/00; G10L 2015/223;
(Continued)

(56) References Cited

U.S. PATENT DOCUMENTS 10,089,072 B2 * 10/2018 Piersol ................... G06F 3/167
10,133,546 B2 * 11/2018 Hart ....................... G06F 3/167
(Continued)

FOREIGN PATENT DOCUMENTS

KR    10-2015-0040445     4/2015
KR    10-2015-0125464     11/2015
(Continued)

OTHER PUBLICATIONS

International Search Report and Written Opinion dated May 20, 2020 in counterpart International Patent Application No. PCT/KR2020/001126.
(Continued)

*Primary Examiner* — Vijay B Chawan
(74) *Attorney, Agent, or Firm* — Nixon & Vanderhye P.C.

(57) ABSTRACT

An electronic device disclosed in the disclosure includes a display, a communication interface comprising communication circuitry, a processor, and a memory. The memory may be configured to store instructions which, when executed, cause the processor to control the electronic device to: determine whether an external device is outputting a voice response corresponding to an utterance input of a user, receive a specified user interaction, and allow visual information associated with the voice response to be displayed on the display in response to the user interaction.

19 Claims, 17 Drawing Sheets

(51) Int. Cl.
*G10L 25/72* (2013.01)
*G10L 15/26* (2006.01)

(58) Field of Classification Search
CPC ... G10L 2015/228; G10L 25/84; G10L 15/00; G10L 15/26; G10L 2015/225; G10L 25/78; F06F 3/167; F06F 16/3329; F06F 2203/0381; F06F 3/01; H04N 21/4394; H04N 21/42203
USPC .............................. 704/270, 270.1, 275, 246
See application file for complete search history.

(56) References Cited

U.S. PATENT DOCUMENTS

| | | | | |
|---|---|---|---|---|
| 10,827,330 | B2* | 11/2020 | Gross | H04W 4/50 |
| 2014/0267022 | A1* | 9/2014 | Kim | G06F 3/16 |
| | | | | 345/156 |
| 2014/0278438 | A1* | 9/2014 | Hart | G06F 3/167 |
| | | | | 704/275 |
| 2015/0100322 | A1* | 4/2015 | Lee | H04N 21/42209 |
| | | | | 704/275 |
| 2015/0317979 | A1 | 11/2015 | Yang et al. | |
| 2016/0162259 | A1* | 6/2016 | Zhao | G06F 3/0488 |
| | | | | 715/728 |
| 2016/0259656 | A1* | 9/2016 | Sumner | G06F 3/04842 |
| 2016/0360382 | A1* | 12/2016 | Gross | G06F 3/04186 |
| 2017/0185375 | A1* | 6/2017 | Martel | G06F 40/279 |
| 2017/0279957 | A1* | 9/2017 | Abramson et al. | G06F 21/36 |
| 2017/0357478 | A1 | 12/2017 | Piersol et al. | |
| 2017/0358478 | A1* | 12/2017 | Thothadri | H01L 25/0753 |
| 2018/0032997 | A1* | 2/2018 | Gordon | G06Q 30/0269 |
| 2019/0012137 | A1* | 1/2019 | Lim | H04N 21/431 |
| 2019/0012141 | A1* | 1/2019 | Piersol | G10L 25/84 |
| 2019/0037173 | A1* | 1/2019 | Lee | H04W 4/18 |
| 2019/0220245 | A1* | 7/2019 | Martel | G10L 15/30 |
| 2019/0349470 | A1* | 11/2019 | Abramson | H04W 4/50 |
| 2020/0090654 | A1 | 3/2020 | Shin et al. | |

FOREIGN PATENT DOCUMENTS

| | | |
|---|---|---|
| KR | 10-1677630 | 11/2016 |
| KR | 10-2019-0006323 | 1/2019 |
| WO | WO 2018-212470 A1 | 11/2018 |

OTHER PUBLICATIONS

Partial Supplemental European Search Report dated Dec. 22, 2021 for EP Application No. 20744935,6.

* cited by examiner

| 810 | | 820 | 821 |
|---|---|---|---|
| News | ✕ | Mobile | LIFTING TERMINAL GAZE RECOGNITION, IRIS RECOGNITION, FINGERPRINT RECOGNITION, Tap to wake, PHYSICAL BUTTON(Press, Long Press), Multi-finger touch, SPECIFIC MOBILE REGION (SLIDE RIGHT TO LEFT), VOICE RECOGNITION, |
| Traffic | | Tablet | LIFTING TERMINAL GAZE RECOGNITION, IRIS RECOGNITION, FINGERPRINT RECOGNITION, Tap to wake, PHYSICAL BUTTON(Press, Long Press), Multi-finger touch, SPECIFIC MOBILE REGION (SLIDE RIGHT TO LEFT), VOICE RECOGNITION, |
| Weather | | TV | LIFTING REMOTE CONTROL GESTURE RECOGNITION, POWER ON REMOTE CONTROL BUTTON MAPPING, SPECIFIC BUTTON LONG PRESS, SPECIFIC BUTTON DOUBLE CLICK, Voice RECOGNITION |
| General Q&A | | Family Hub | Tap to wake, Soft Button TOUCH(Tap, Long tap), Multi-finger touch, Voice RECOGNITION, IRIS RECOGNITION, GESTURE, SPECIFIC SCREEN REGION(SLIDE RIGHT TO LEFT AND THE LIKE)... |
| Music | | Watch | LIFTING DEVICE GAZE RECOGNITION, FINGERPRINT RECOGNITION, Tap to wake, PHYSICAL BUTTON (Press, Long Press), multi-finger touch, Voice RECOGNITION.. |
| Audiobook | | VR | GAZE RECOGNITION, VR DEVICE TAPPING(Tap, Double Tap), Voice RECOGNITION... |
| Alarm/Timer | | Appliances with Display | Tap to wake, PHYSICAL BUTTON MAPPING, Voice RECOGNITION.. |
| To-do | | PC | SPECIFIC KEYBOARD COMBINATION, SPECIFIC MOUSE COMBINATION, MOUSE GESTURE, MOUSE CLICKS(TRIPLE CLICK AND THE LIKE)... |
| Calendar | | Note-PC | SPECIFIC KEYBOARD COMBINATION, SPECIFIC MOUSE COMBINATION, MOUSE GESTURE, MOUSE CLICKS(TRIPLE CLICK AND THE LIKE), FINGERPRINT RECOGNITION, GAZE RECOGNITION, LAPTOP WAKE.. |
| Calculator | | ... | |
| Reminder | | | |
| Control Device | | | |
| 3rd Party Services | | | |
| Notification | | | |
| ... | | | |

FIG. 8

METHOD FOR DISPLAYING VISUAL INFORMATION ASSOCIATED WITH VOICE INPUT AND ELECTRONIC DEVICE SUPPORTING THE SAME

CROSS-REFERENCE TO RELATED APPLICATION

This application is based on and claims priority under 35 U.S.C. § 119 to Korean Patent Application No. 10-2019-0008362, filed on Jan. 22, 2019, in the Korean Intellectual Property Office, the disclosure of which is incorporated by reference herein its entirety.

BACKGROUND

1. Field

The disclosure relates to a method for displaying visual information associated with voice recognition based on user interaction, and an electronic device supporting the same.

2. Description of Related Art

Various devices that operate based on interactive voice input of a user have been released. For example, an electronic device such as a smartphone, a tablet PC, or the like may execute an application (e.g., Bixby and Siri) corresponding to a voice command of the user. The application may receive an utterance input of the user, and output a voice response associated with the received utterance input.

Recently, devices such as an artificial intelligence speaker, an artificial intelligence robot corresponding to the voice command of the user have been released. Further, voice recognition is also utilized in household electrical appliances such as a refrigerator, a TV, and a washing machine.

Accordingly, when operating in response to a voice input of a user, an electronic device according to the prior art provides a voice response corresponding to an utterance input of the user. However, provision of additional information via linkage with other devices is insufficient. When the user wants to identify additional information associated with the voice response, the user has to identify a history list of an application through a device having a separate display or has to search newly.

The above information is presented as background information only to assist with an understanding of the disclosure. No determination has been made, and no assertion is made, as to whether any of the above might be applicable as prior art with regard to the disclosure.

SUMMARY

Embodiments of the disclosure address at least the above-mentioned problems and/or disadvantages and to provide at least the advantages described below.

In accordance with an example aspect of the disclosure, an electronic device includes a display, a communication interface comprising communication circuitry configured to perform wireless communication with an external device, a processor, and a memory operatively connected to the processor, wherein the memory stores instructions which, when executed, cause the processor to control the electronic device to: determine whether the external device is outputting a voice response corresponding to an utterance input of a user, receive a specified user interaction, and allow visual information associated with the voice response to be displayed on the display in response to the user interaction.

Other aspects, advantages, and salient features of the disclosure will become apparent to those skilled in the art from the following detailed description, which, taken in conjunction with the annexed drawings, discloses various example embodiments of the disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 8 is a diagram illustrating example functions of a first device and types/interactions of a second device according to various embodiments;

In the description of the drawings, the same or similar reference numerals may be used for the same or similar components.

DETAILED DESCRIPTION

Figure 1:
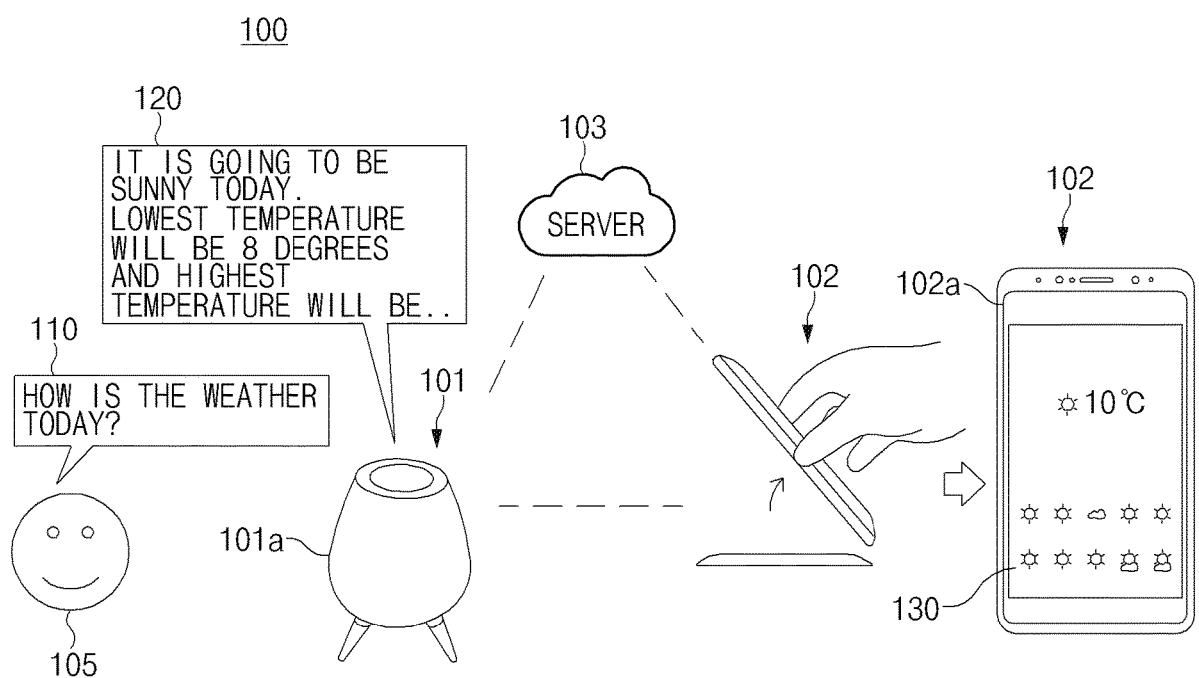
FIG. 1 is a diagram illustrating an example voice output system according to various embodiments.

Hereinafter, various example embodiments of the disclosure will be described with reference to the accompanying drawings. However, it should be appreciated that the various example embodiments of the disclosure are not intended to limit the technological features set forth herein to particular embodiments and the scope of the disclosure includes various modifications, equivalents, and/or alternatives for a corresponding embodiment. In the description of the drawings, the same or similar reference numerals may be used for the same or similar components.

FIG. 1 is a diagram illustrating an example voice output system according to various embodiments.

Referring to FIG. 1, a voice output system 100 may include a first device 101, a second device 102, and a server 103. The first device 101, the second device 102, and the server 103 may be connected with each other via a wired or wireless network. For example, the first device 101 and the second device 102 may be wirelessly connected to a network device (e.g., AP) for WiFi communication. The network device (e.g., AP) may be connected to the server 103. As another example, each of the first device 101 and the second device 102 may be a device capable of cellular communication, and may be connected to the server 103 via the cellular communication. As another example, the first device 101 and the second device 102 may be connected with each other via short-range wireless communication (e.g., BLE).

The first device (or a voice output device) (e.g., AI speaker) 101 may receive an utterance input 110 of a user 105 through a microphone. The first device 101 may analyze the utterance input 110, and provide a voice response 120 corresponding to the analyzed utterance input 110. The first device 101 may analyze the utterance input 110 through an internal operation or an operation on an external device (e.g., the server 103 or a separate voice recognition server (not shown)), and output the corresponding voice response 120. In an example embodiment, the first device 101 may not include a separate display or may be a device having a display having a resolution equal to or lower than a specified resolution.

According to an example embodiment, the first device 101 may execute a voice recognition application (e.g., Bixby or Siri) that recognizes a user's interactive command. The first device 101 may activate an input standby state that waits for receiving the interactive command through a user's specified wake up utterance (e.g., Hi, Bixby). The first device 101 may receive the user's utterance input (e.g., How is the weather today?) 110 in the input standby state. The first device 101 may output the voice response 120 (e.g., It is going to be sunny today. The lowest temperature will be 19 degrees and the highest temperature will be . . . ) corresponding to the utterance input (e.g., How is the weather today?) 110 through a speaker 101a.

The second device 102 may be a device having a display 102a. The second device 102 may display various contents (e.g., image, text, UI, or emoji) through the display 102a.

According to various embodiments, the second device 102 may receive various interactions of the user. The interaction may be an input generated by the user to the second device 102 or an operation of the user recognized by the second device 102 through various sensors. For example, the interaction may be an operation of lifting the second device 102 by the user. The second device 102 may recognize the operation of lifting the second device 102 by the user through an acceleration sensor or a proximity sensor.

FIG. 1 illustrates an example in which the interaction of the user is the operation of lifting the second device 102, but the interaction is not limited thereto. The interaction may be variously set depending on a type of the second device 102. For example, when the second device 102 is a smart watch, the interaction may be an operation, by the user, of wearing the smart watch on a wrist thereof, and lifting a hand thereof.

According to an example embodiment, in a state in which the first device 101 is outputting the voice response 120 corresponding to the utterance input 110 of the user (or in a state in which the voice response 120 is scheduled to be output within a specified first time (e.g., 3 seconds), or in a state of being within a specified time (e.g., 3 seconds) after the voice response 120 is output), and when a specified interaction of the user occurs, the second device 102 may display visual information 130 associated with the response on the display 102a.

The visual information 130 may include the same information as the voice response 120 being output from the first device 101 or information expanded than the voice response 120. For example, the visual information 130 may include a text corresponding to the voice response 120, an icon or an image associated with the voice response 120.

According to an example embodiment, the second device 102 may receive the visual information 130 from the first device 101 or the server 103. For example, the visual information 130 may be provided from the server 103. When the specified interaction occurs, the second device 102 may output the visual information 130 received from the server 103 through the display 102a.

According to various embodiments, the first device 101 and the second device 102 may be set by the same user account. For example, the first device 101 may be a shared device (or a family device) in which accounts of first to fifth users are registered, and the second device 102 may be a personal device in which an account of the second user is registered. The server 103 may store user account information registered in each of the first device 101 and the second device 102.

The server 103 may perform a process associated with the visual information 130 output from the second device 102. The server 103 may associate data transmission between the first device 101 and the second device 102. The server 103 may generate the visual information 130 in response to a request of the first device 101 or the second device 102, and transmit the generated visual information 130 to the first device 101 or the second device 102. According to an example embodiment, the server 103 may be an IoT server that performs operations associated with control of an IoT device.

Figure 2:
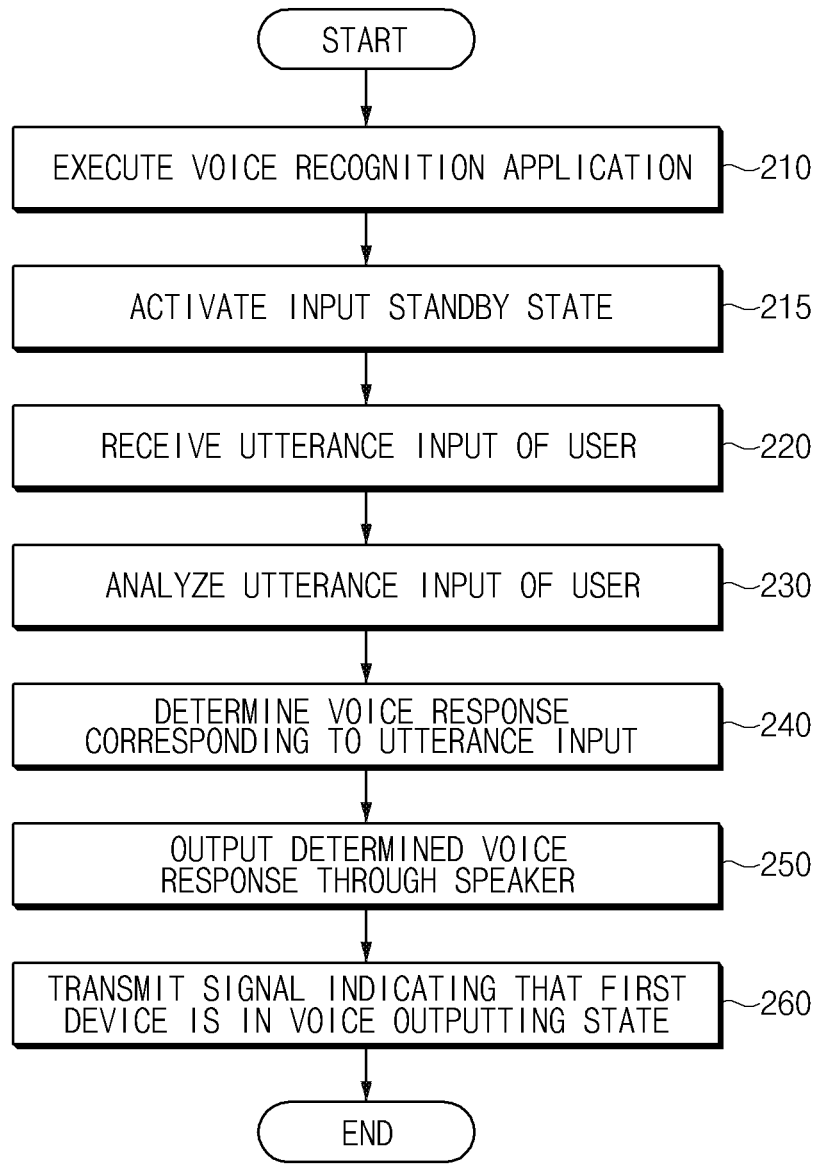
FIG. 2 is a flowchart illustrating an example output of a voice response from a first device according to various embodiments.

FIG. 2 is a flowchart illustrating an example operation of outputting a voice response from a first device according to various embodiments.

Referring to FIG. 2, in operation 210, the first device 101 may execute the voice recognition application (e.g., Bixby or Siri). The voice recognition application may recognize the interactive command of the user, and output the corresponding voice response through the speaker.

In operation 215, the first device 101 may activate the state of waiting for the utterance input of the user (hereinafter, input standby state). In an example embodiment, the voice recognition application may activate the input standby state through the user's specified wake up utterance (e.g., Hi, Bixby).

In operation 220, the first device 101 may receive the utterance input of the user. For example, in the input standby state, the first device 101 may receive the user's utterance input (e.g., How is the weather today?) 110.

In operation 230, the first device 101 may analyze the utterance input 110 of the user. In an example embodiment, the first device 101 may analyze the utterance input 110 of the user through the internal operation of the first device 101. In another embodiment, the first device 101 may transmit the utterance input 110 to an external voice recognition server, and request analysis of the utterance input 110.

In operation 240, the first device 101 may determine the voice response 120 corresponding to the utterance input 110 of the user. In an example embodiment, the first device 101 may analyze the utterance input 110 of the user through the internal operation of the first device 101, and determine the corresponding voice response 120. The first device 101 may transmit some information to the server 103 and request analysis thereof. In another embodiment, the first device 101 may transmit the utterance input to the server 103, and request analysis of the utterance input and transmission of the voice response 120.

In operation 250, the first device 101 may output the determined voice response through the speaker 101a. For example, when the user's utterance input (e.g., How is the weather today?) 110 is received, the first device 101 may output the corresponding voice response 120 (e.g., It is going to be sunny today. The lowest temperature will be 19 degrees and the highest temperature will be . . . ).

According to various embodiments, the first device 101 may output the voice response 120 to a user authorized through a preset authentication process. For example, the first device 101 may analyze a frequency pattern of a user voice from the utterance input 110 of the user to perform the user authentication. The first device 101 may output the voice response 120 in response to the request of the authorized user, and may inform authentication failure when it is not the authorized user.

In operation 260, the first device 101 may transmit a signal indicating that the first device 101 is in a state in which the voice response 120 is being output through the speaker 101a to the second device 102 or the server 103 (or a state in which the voice response 120 is scheduled to be output within the specified first time (e.g., 3 seconds), or a state of being within the specified time (e.g., 3 seconds) after the voice response 120 is output) (hereinafter, voice outputting state).

According to various embodiments, the operation 260 may be performed before the operation 250. For example, the first device 101 may transmit the signal indicating the voice outputting state to the second device 102 or the server 103 before outputting the voice response 120.

According to various embodiments, the first device 101 may transmit, together with the signal indicating that the first device 101 is in the voice outputting state, information about the voice response 120 being output directly or through the server 103 to the second device 102. The second device 102 may receive the information about the voice response 120, and when the specified interaction occurs, output the visual information 130 based on the information about the voice response 120 (see, e.g., FIG. 3).

According to various embodiments, the first device 101 may transmit the signal indicating that the first device 101 is in the voice outputting state to the second device 102 or the server 103, without the utterance input of the user. When a specified event (e.g., reception of a message, reception of an email, occurrence of an alarm event, occurrence of a schedule notification) occurs, the first device 101 may output a voice notification (e.g., John, a message arrived) associated with the event, and transmit the signal indicating that the first device 101 is in the voice outputting state to the second device 102 or the server 103.

Figure 3:
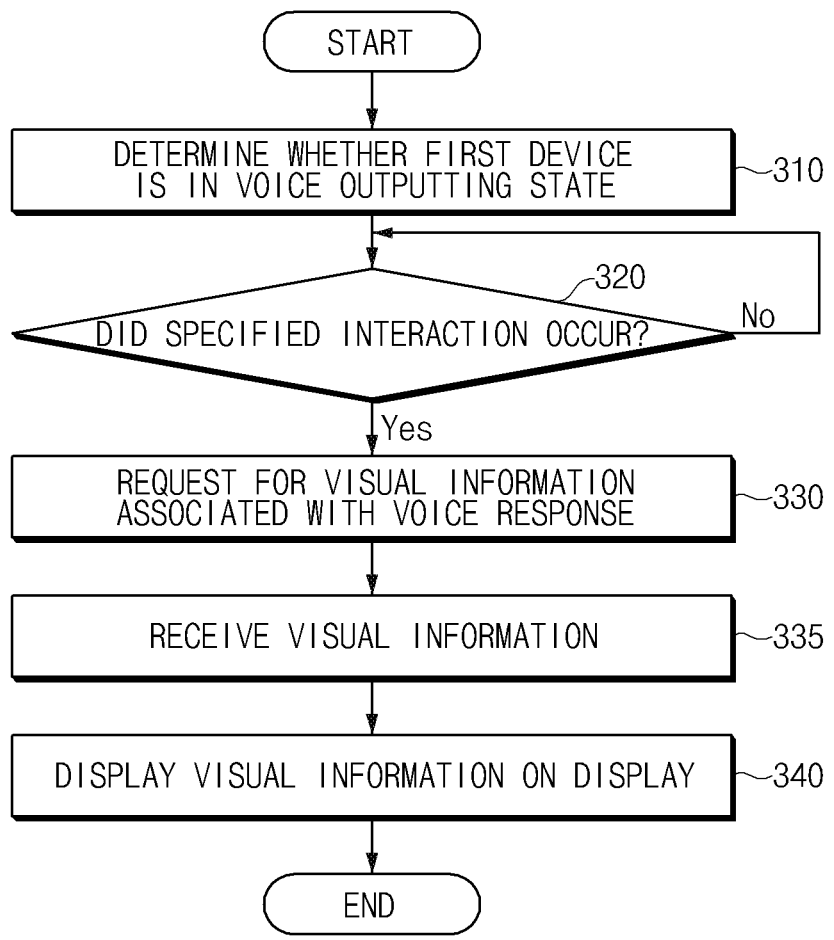
FIG. 3 is a flowchart illustrating an example process of outputting visual information from a second device according to various embodiments.

FIG. 3 is a flowchart illustrating an example process of outputting visual information from a second device according to various embodiments.

Referring to FIG. 3, in operation 310, the second device 102 may determine whether the first device 101 is in the voice outputting state. According to an example embodiment, the voice outputting state may be a state in which, after receiving the utterance input 110 of the user, the first device 101 outputs the voice response 120 corresponding to the utterance input 110. According to another embodiment, the voice outputting state may be a state of outputting, after the specified event (e.g., reception of a message, reception of an email, occurrence of an alarm event, occurrence of a schedule notification) is occurred in the first device 101, the voice notification (e.g., John, a message arrived) associated with the event (see FIG. 14).

According to an example embodiment, the second device 102 may receive the signal indicating that the first device 101 is in the voice outputting state directly from the first device 101. For example, the second device 102 may receive the signal via short-range communication, such as the BLE communication.

According to another embodiment, the second device 102 may receive the signal indicating that the first device 101 is in the voice outputting state through the network device. For example, when the first device 101 and the second device 102 are connected to the same network device (e.g., AP), the second device 102 may receive the signal from the first device 101 through the network device.

According to another embodiment, the second device 102 may receive the signal indicating that the first device 101 is in the voice outputting state through the server 103. For example, when the first device 101 and the second device 102 are registered by the same user account in the server 103, the second device 102 may receive the signal from the server 103.

In operation 320, the second device 102 may detect occurrence of the designated interaction. The interaction may be input of a preset user to allow the visual information 130 associated with the voice response 120 being output from the first device 101 to be output, or the operation (or movement of the second device 102) of the user recognized by the second device 102 through the various sensors. For example, the second device 102 may determine whether the specified interaction (e.g., lifting the second device 102) of the user occurs. The second device 102 may recognize the operation by the user of lifting the second device 102 through the acceleration sensor or the proximity sensor.

According to various embodiments, the operation 320 may also be performed before the operation 310. In this case, when recognizing the occurrence of the specified interaction, the second device 102 may request the first device 101 or the server 103 to determine whether the first device 101 is in the voice outputting state.

In operation 330, when the specified interaction occurs ("Yes" in operation 320), the second device 102 may request the first device 101 or the server 103 for the visual information 130 associated with the voice response being output from the first device 101. The visual information may further include additional information such as the icon and the image associated with the voice response. For example, when the voice response 120 is 'Today is a bit cloudy, and it will rain. The lowest temperature will be 3 degrees, and the highest temperature will be 8 degrees.', the visual information 130 may further include items such as weather images, lowest/highest temperature, current temperature, and weekly weather.

In operation 335, the second device 102 may receive the visual information 130 from the first device 101 or the server 103. According to an example embodiment, when not receiving the separate visual information 130, the second device 102 may display text corresponding to the voice response being output from the first device 101 on the display 102*a*.

In operation 340, the second device 102 may display the received visual information 130 on the display 102*a*. For example, the second device 102 may output the visual information 130 received from the first device 101 or the server 103 on the display 102*a* after a simple conversion such as resolution conversion.

According to various embodiments, the second device 102 may display the visual information 130 after performing a specified authentication process. For example, when the specified interaction occurs and the visual information 130 associated with the voice response 120 is received, the second device 102 may display an interface (e.g., a password input screen, a pattern input screen, or an iris recognition screen) for the user authentication. When the specified user is identified through the interface, the second device 102 may display the visual information 130 on the display 102*a*.

According to various embodiments, the second device 102 may terminate the output of the displayed visual information 130 after a specified time (e.g., 3 seconds). Information associated with the output visual information 130 may be stored in a history of the voice recognition application.

Figure 4:
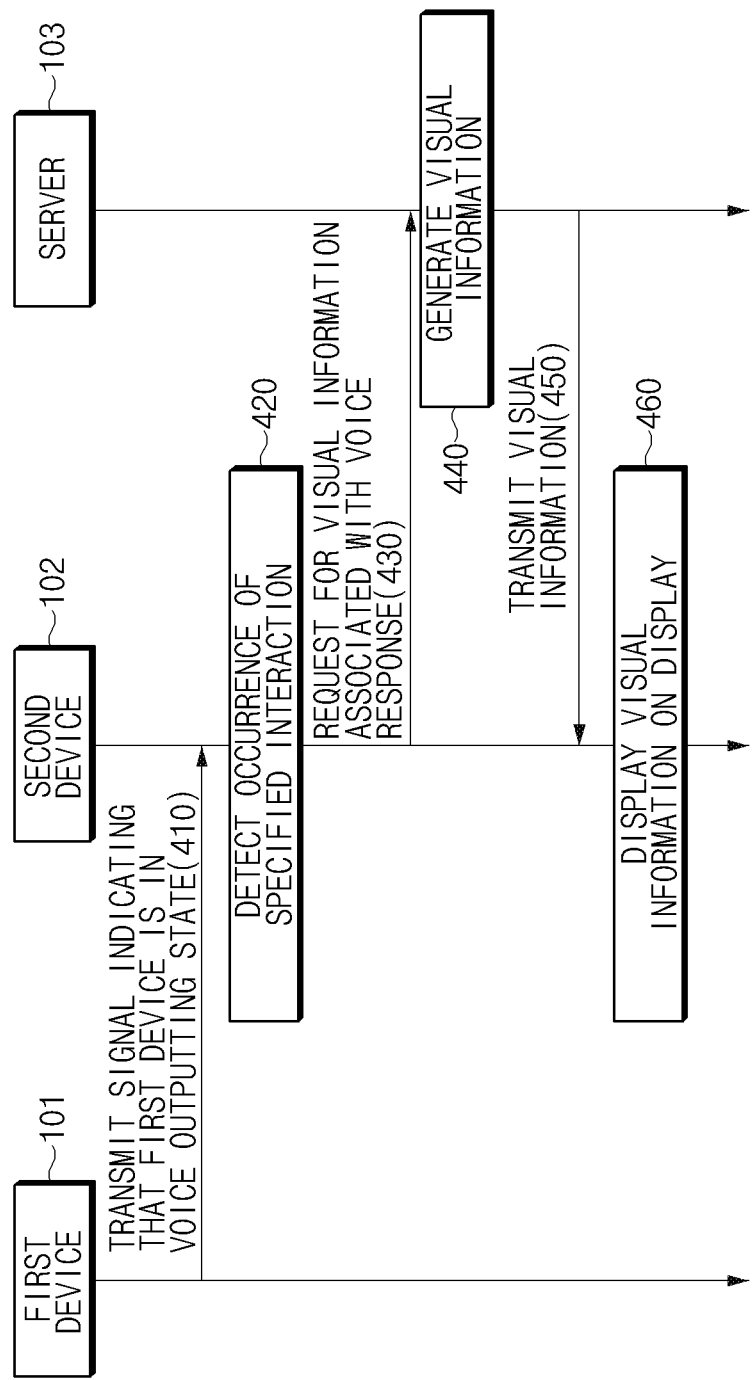
FIG. 4 is a signal flow diagram illustrating an example signal initiating an example process for outputting visual information from a first device according to various embodiments.

FIG. 4 is a signal flow diagram illustrating an example of a signal initiating an example process for outputting visual information from a first device according to various embodiments.

Referring to FIG. 4, in operation 410, the first device 101 may transmit the signal indicating that the first device 101 is in the voice outputting state to the second device 102. According to an example embodiment, the first device 101 and the second device 102 may define a channel capable of data communication via the short-range communication. The first device 101 may directly transmit the signal to the second device 102 via the channel. According to another embodiment, the first device 101 and the second device 102 may be connected to the same network device (e.g., AP). The first device 101 may transmit the signal to the second device 102 through the network device (e.g., an AP).

According to an embodiment, the first device 101 may transmit, together with the signal indicating that the first device 101 is in the voice outputting state, the information about the voice response 120 being output to the second device 102. For example, the first device 101 may transmit the text associated with the voice response 120, or transmit information that summarizes the voice response 120 (e.g., weather/sunny/highest temperature/lowest temperature/current temperature . . . ).

According to another embodiment, the first device 101 may transmit the signal indicating that the first device 101 is in the voice outputting state to the second device 102, and transmit the information about the voice response 120 being output to the server 103. The server 103 may generate the visual information 130 associated with the voice response 120 based on the received information.

In operation 420, the second device 102 may detect the occurrence of the specified interaction when the first device 101 is in the voice outputting state. The interaction may be the input generated by the user to the second device 102 or the operation of the user recognized by the second device 102 through the various sensors. For example, the second device 102 may recognize the operation, by the user, of lifting the second device 102 through the acceleration sensor or the proximity sensor.

In operation 430, when the specified interaction occurs, the second device 102 may request the server 103 for the visual information 130 associated with the voice response 120 being output from the first device 101. The visual information 130 may further include the additional information such as the icon and the image associated with the voice response 120.

According to an example embodiment, when the second device 102 receives the information about the voice response 120 being output from the first device 101, the second device 102 may request the visual information 130 while transmitting the received information to the server 103.

In operation 440, the server 103 may generate the visual information 130 in response to the request. According to an example embodiment, the server 103 may generate the visual information 130 based on the information about the voice response 120 transmitted from the first device 101 or the second device 102. According to another embodiment, the server 103 may receive the visual information 130 or receive information required for generating the visual information 130 from the separate voice recognition server.

In operation 450, the server 103 may transmit the generated visual information 130 to the second device 102.

In operation 460, the second device 102 may display the received visual information 130 on the display 102*a*. For example, the second device 102 may display the visual information 130 in a form of a pop-up window. The user may identify the information corresponding to the voice response 120 output through the speaker 101*a* of the first device 101 through the visual information 130 displayed on the display 102*a* of the second device 102.

Figure 5:
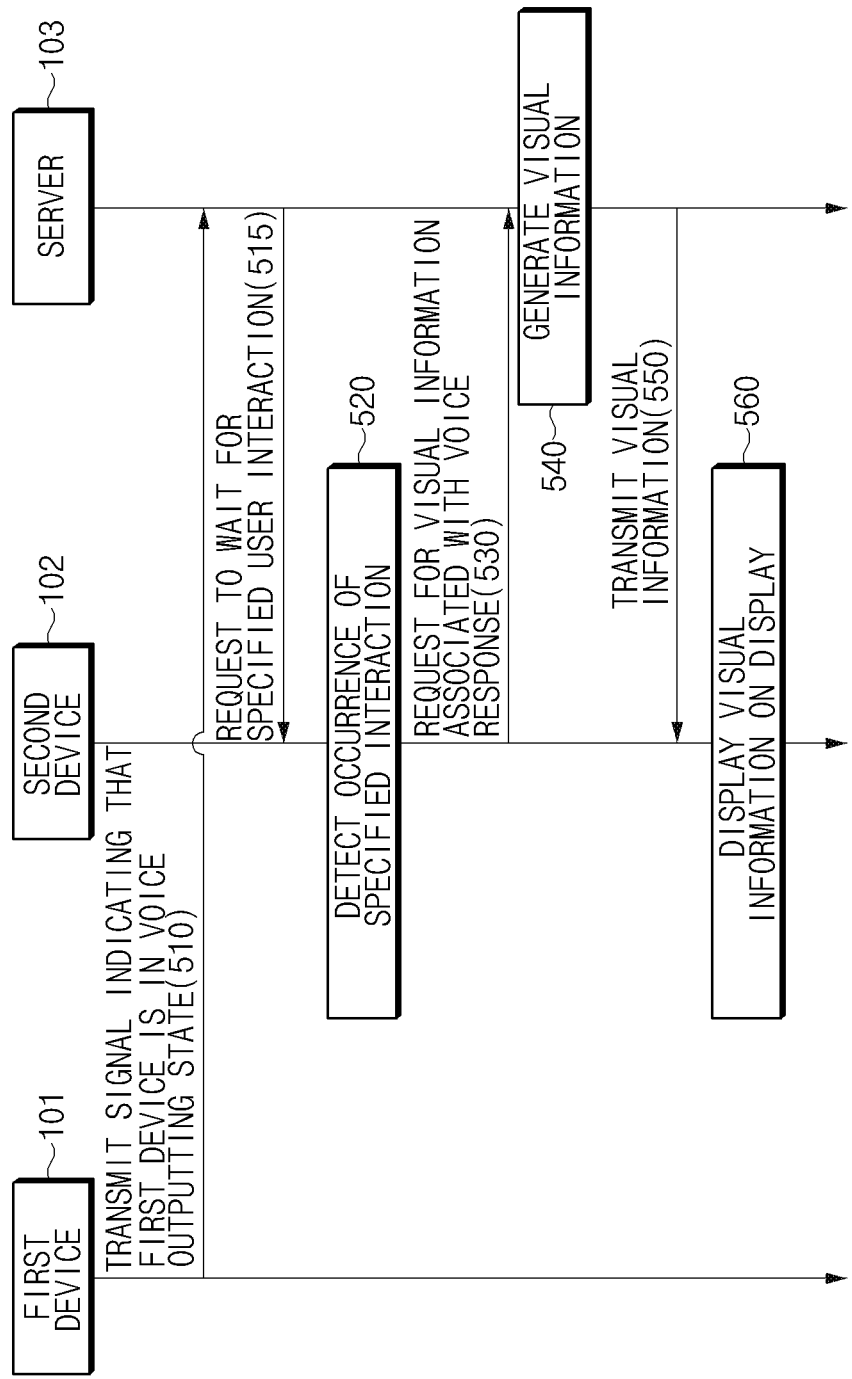
FIG. 5 is a signal flow diagram illustrating an example signal initiating an example process for outputting visual information through a server from a first device according to various embodiments.

FIG. 5 is a signal flow diagram illustrating an example of a signal initiating an example process for outputting visual information through a server from a first device according to various embodiments.

Referring to FIG. 5, in operation 510, the first device 101 may transmit the signal indicating that the first device 101 is in the voice outputting state to the server 103. For example, in a process of providing a voice recognition service through the separate voice recognition server, when the voice response 120 to be output is determined, the first device 101 may transmit the signal indicating that the first device 101 is in the voice outputting state to the server 103.

According to various embodiments, when the first device 101 provides the voice recognition service through the separate voice recognition server, the voice recognition server may transmit the signal indicating that the first device 101 is in the voice outputting state to the server 103. In this case, the first device 101 may not transmit a separate signal to the server 103.

According to another embodiment, the server 103 may be a server that performs both the role as the voice recognition server and the role as the IoT server. In this case, the operation 510 may not be performed.

In operation 515, the server 103 may request the second device 102 to wait for the specified user interaction.

In operation 520, the occurrence of the specified interaction may be detected. The interaction may be the input generated by the user to the second device 102 or the operation of the user recognized by the second device 102 through the various sensors.

Operations 530, 540, 550, 560 may be the same as or similar to the operations 430 to 460 in FIG. 4, and thus a repeated description thereof may not be repeated here.

Figure 6:
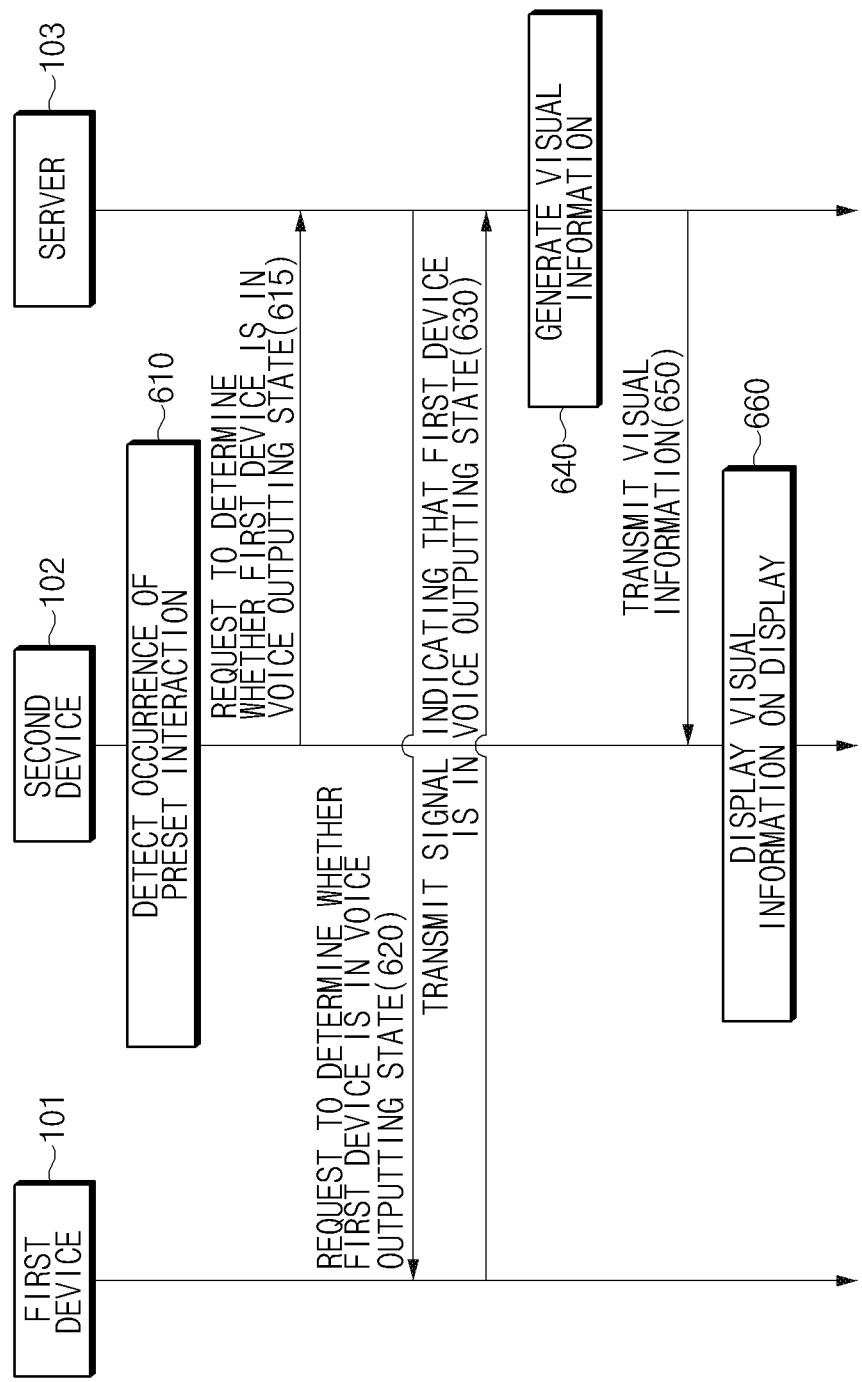
FIG. 6 is a signal flow diagram illustrating an example signal initiating an example process for outputting visual information through a server from a second device according to various embodiments.

FIG. 6 is a signal flow diagram illustrating an example of a signal initiating an example process for outputting visual information through a server from a second device according to various embodiments.

Referring to FIG. 6, in operation 610, the second device 102 may detect occurrence of a preset interaction. The interaction may be the input generated by the user to the second device 102 or the operation of the user recognized by the second device 102 through the various sensors.

In operation 615, the second device 102 may request the server 103 to determine whether the first device 101 is in the voice outputting state.

In operation 620, the server 103 may request the first device 101 to determine whether the first device 101 is in the voice outputting state. According to an example embodiment, when the first device 101 is providing a voice recognition related service through the separate voice recognition server, the server 103 may request the voice recognition server to determine whether the first device 101 is in the voice outputting state.

In operation 630, when the first device 101 is in the voice outputting state, the first device 101 may transmit the signal indicating that the first device 101 is in the voice outputting state to the server 103.

In operation 640, the server 103 may generate the visual information 130 in response to the signal. According to an example embodiment, the server 103 may generate the visual information 130 based on the information about the voice response 120 transmitted from the first device 101 or the second device 102.

According to another embodiment, the server 103 may receive the visual information 130 or the information required for generating the visual information 130 from the separate voice recognition server.

In operation 650, the server 103 may transmit the generated visual information 130 to the second device 102.

In operation 660, the second device 102 may display the received visual information 130 on the display 102a. For example, the second device 102 may display the visual information 130 in the form of the pop-up window.

Figure 7:
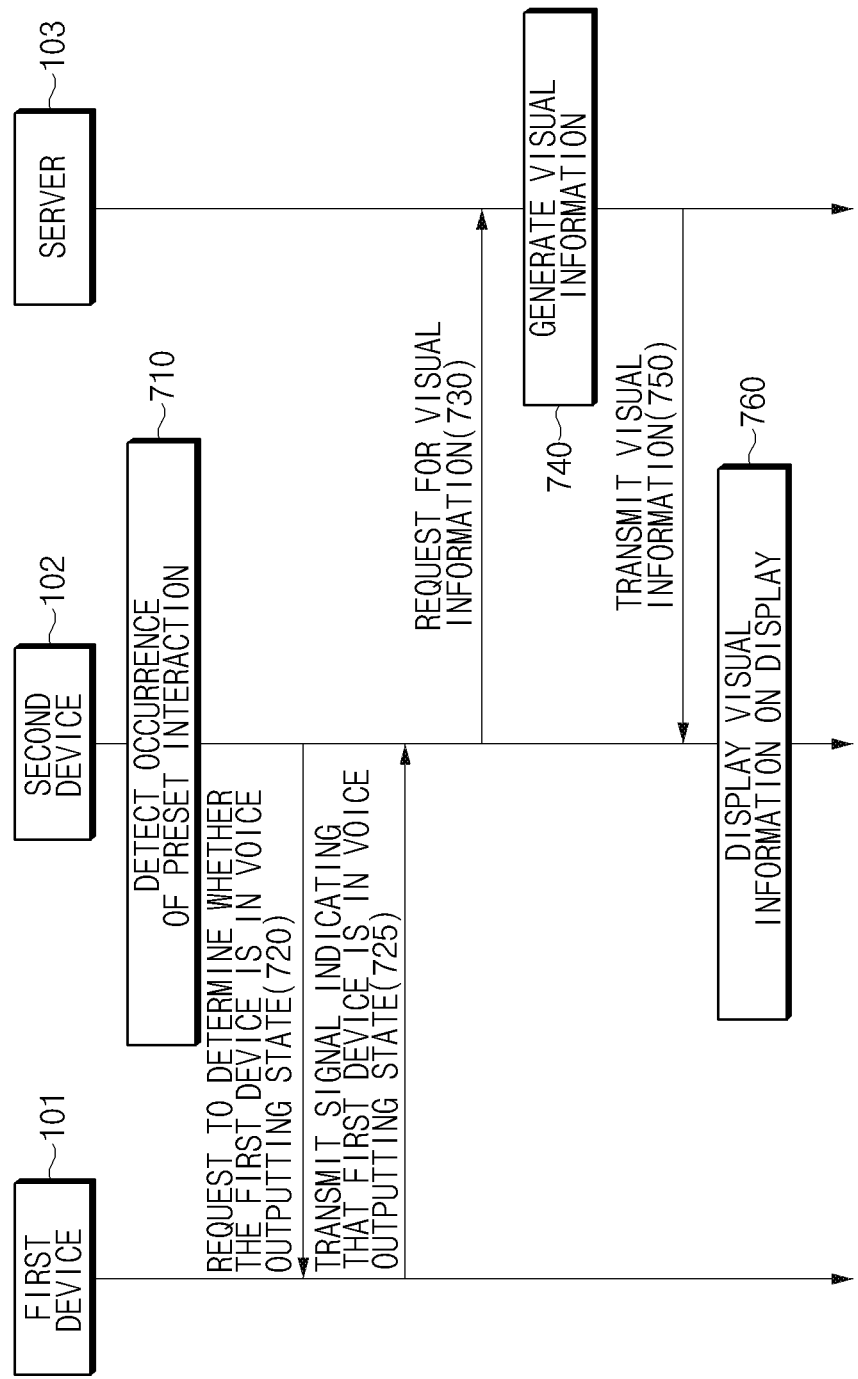
FIG. 7 is a signal flow diagram illustrating an example signal initiating an example process for outputting visual information through a first device from a second device according to various embodiments.

FIG. 7 is a signal flow diagram illustrating an example of a signal initiating an example process for outputting visual information through a first device from a second device according to various embodiments.

Referring to FIG. 7, in operation 710, the second device 102 may detect the occurrence of the preset interaction. The interaction may be the input generated by the user to the second device 102 or the operation of the user recognized by the second device 102 through the various sensors.

In operation 720, the second device 102 may request the first device 101 to determine whether the first device 101 is in the voice outputting state. According to an example embodiment, the first device 101 and the second device 102 may define the channel capable of the data communication via the short-range communication. The second device 102 may transmit the request directly to the first device 101 via the channel. According to another embodiment, the first device 101 and the second device 102 may be connected to the same network device (e.g., AP). The second device 102 may transmit the request to the first device 101 through the network device (e.g., an AP).

In operation 725, the first device 101 may transmit the signal indicating that the first device 101 is in the voice outputting state to the second device 102.

According to an embodiment, the first device 101 may transmit, together with the signal indicating that the first device 101 is in the voice outputting state, the information associated with the voice response 120 being output to the second device 102. For example, the first device 101 may transmit the text associated with the voice response 120, or transmit the information that summarizes the voice response 120 (e.g., weather/sunny/highest temperature/lowest temperature/current temperature . . . ).

According to another embodiment, the first device 101 may transmit the signal indicating that the first device 101 is in the voice outputting state to the second device 102, and transmit the information associated with the voice response 120 being output to the server 103. The server 103 may generate the visual information 130 associated with the voice response 120 based on the received information.

In operation 730, the second device 102 may request the server 103 for the visual information 130 associated with the voice response 120 being output from the first device 101. The visual information 130 may further include the additional information such as the icon and the image associated with the voice response 120.

According to an example embodiment, when receiving the information about the voice response 120 being output from the first device 101, the second device 102 may request the visual information 130 while transmitting the received information to the server 103.

In operation 740, the server 103 may generate the visual information 130 in response to the request. According to an example embodiment, the server 103 may generate the visual information 130 based on the information about the voice response 120 transmitted from the first device 101 or the second device 102. According to another embodiment, when the server 103 is the IoT server, the server 103 may receive the visual information 130 or the information required for generating the visual information 130 from the separate voice recognition server.

In operation 750, the server 103 may transmit the generated visual information 130 to the second device 102.

In operation 760, the second device 102 may display the received visual information 130 on the display 102a. For example, the second device 102 may display the visual information 130 in the form of the pop-up window.

FIG. 8 is a diagram illustrating example functions of a first device and types/interactions of a second device according to various embodiments. FIG. 8 is illustrative, and the disclosure is not limited thereto.

Referring to FIG. 8, the first device 101 may be a device that does not include the separate display or includes the display having the resolution equal to or less than the specified resolution. The first device 101 may perform various functions included in a first list 810 through the speaker 101a. Each function may be executed through at least one application.

The first device 101 may execute the voice recognition application that recognizes the interactive command of the user. The voice recognition application may activate the voice outputting state based on an utterance input of the user, a signal from the external device, or a notification request from another application installed in the first device 101. For example, after the utterance input 110 of the user occurs, the first device 101 may output the voice response 120 to activate the voice outputting state. As another example, when the account of the registered user receives a message, the first device 101 may output a message reception notification as a voice to activate the voice outputting state. As another example, when an alarm time set in an alarm app installed in the first device 101 has come, the first device 101 may output an alarm content as a voice to activate the voice outputting state.

The second device 102 may be the device having the display 102*a*. The second device 102 may be various kinds of electronic devices as in a second list 820. For example, the second device 102 may be the personal device such as the smartphone, the tablet PC, and the smart watch. As another example, the second device 102 may be the shared device (or family device) such as the TV and the refrigerator.

The second device 102 may receive user interactions set differently for each type of the device as in a third list 821. For example, when the second device 102 is the smartphone, the user interaction may be set as an operation such as lifting a terminal/gaze recognition/iris recognition/fingerprint recognition. As another example, when the second device 102 is a TV, the user interaction may be set as an operation such as lifting a remote control/recognizing a gesture/powering on/remote control button mapping.

Figure 9:
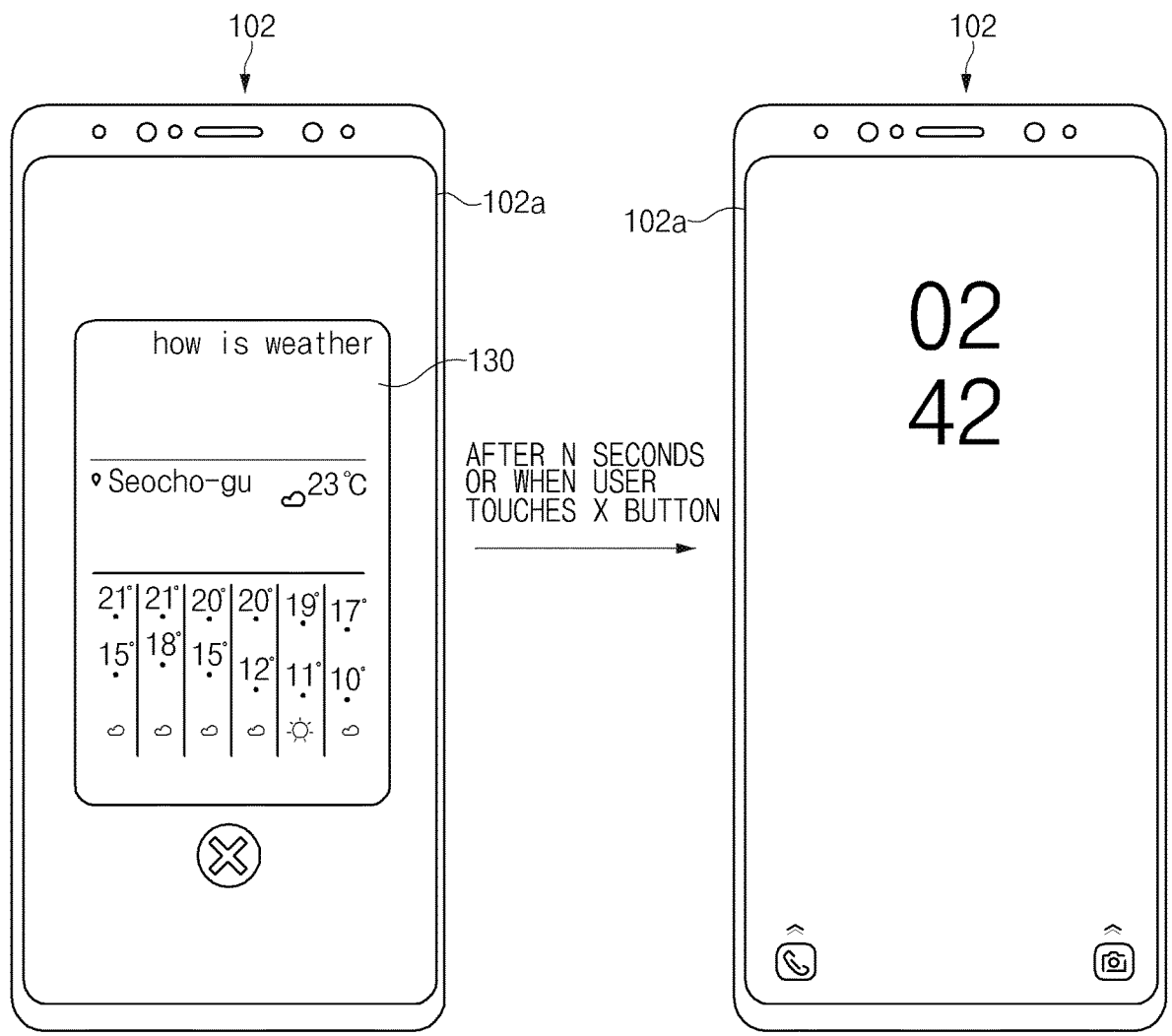
FIG. 9 is a diagram illustrating example display and deletion of visual information according to various embodiments.

FIG. 9 is a diagram illustrating example display and deletion of visual information according to various embodiments. FIG. 9 is illustrative, and the disclosure is not limited thereto.

Referring to FIG. 9, when the preset user interaction occurs, the second device 102 may display the visual information 130 associated with the voice response 120 being output from the first device 101 on the display 102*a*.

According to an example embodiment, the visual information 130 may include the icon or the image associated with the voice response 120. For example, when the voice response 120 is associated with the today's weather, the visual information 130 may include images, icons associated with the weather, and may further include additional information such as weekly weather and recommended attire, in addition to the today's weather.

According to an example embodiment, the visual information 130 may be displayed in the pop-up form while maintaining a screen content of the first device 101. For example, the visual information 130 may be displayed in the pop-up form in a screen-locked state.

The user may more easily identify information, which is not identified or is missed through the voice response 120 output through the speaker from the first device 101, through the visual information 130 displayed on the display of the second device 102.

According to various embodiments, the second device 102 may terminate the display of the visual information 130 when the specified time (e.g., 5 seconds) elapses after displaying the visual information 130. In this case, the second device 102 may be switched to a previous state (e.g., the screen-locked state) before displaying the visual information 130. The information associated with the output visual information 130 may be stored in the history of the voice recognition application.

Figure 10:
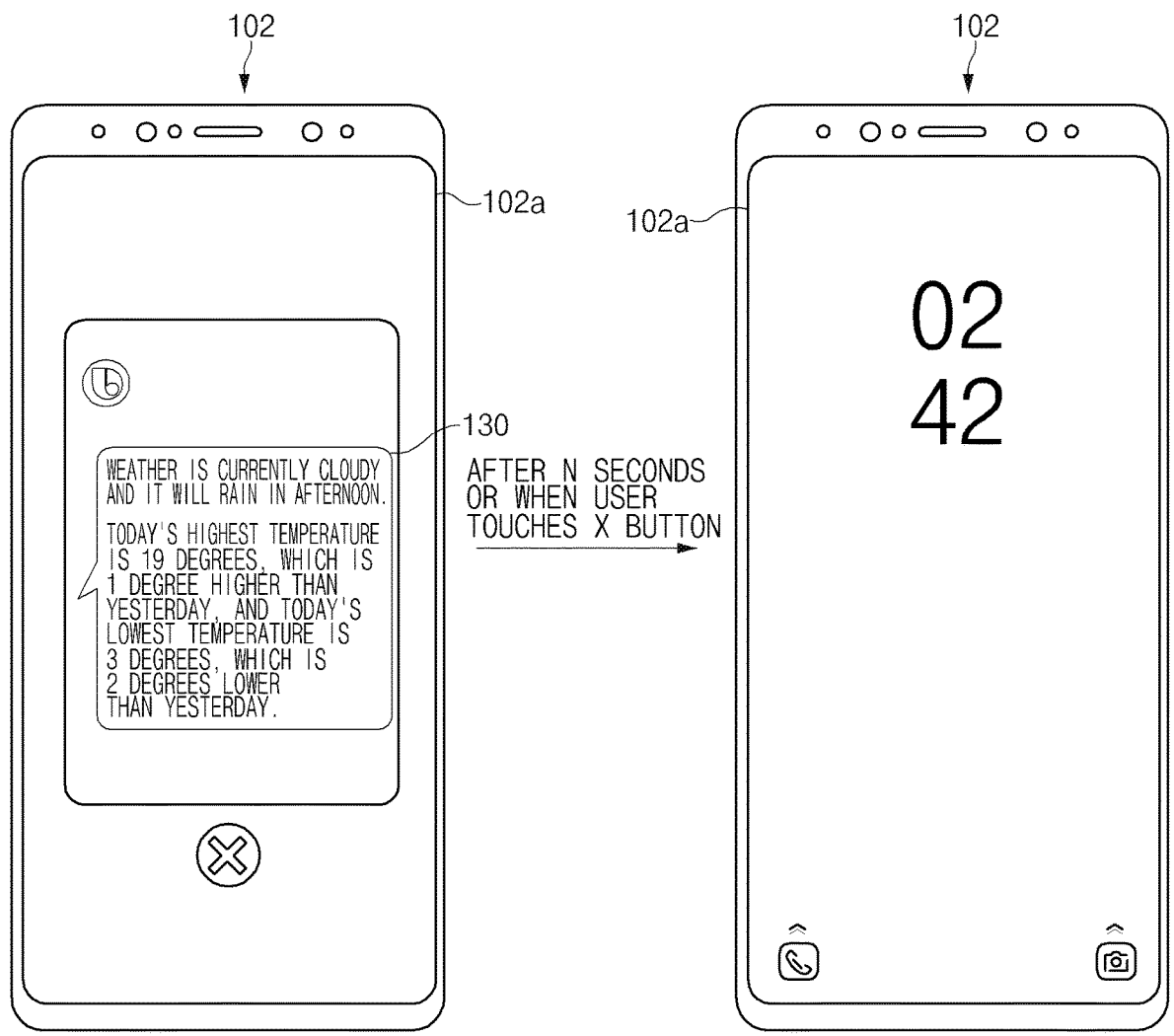
FIG. 10 is a diagram illustrating example text display of visual information according to various embodiments.

FIG. 10 is a diagram illustrating example text display of visual information according to various embodiments. FIG. 10 is illustrative, and the disclosure is not limited thereto.

Referring to FIG. 10, when the preset user interaction occurs, the second device 102 may display the visual information 130 associated with the voice response 120 being output from the first device 101 on the display 102*a*.

According to an example embodiment, the visual information 130 may include the text corresponding to the voice response 120. For example, when the voice response 120 is associated with the today's weather, the visual information 130 may include text indicating specific today's weather corresponding to the voice response 120.

According to an example embodiment, the visual information 130 may be displayed in the pop-up form while maintaining the screen content of the first device 101. For example, the visual information 130 may be displayed in the pop-up form in the screen-locked state.

According to various embodiments, the visual information 130 is primarily displayed in a form of a pop-up notifying that there is the visual information 130. When a separate authentication (e.g., password input, pattern input, or iris recognition) is completed, a specific content may be displayed.

The user may more easily identify the information, which is not identified or is missed through the voice response 120 output through the speaker from the first device 101, through the visual information 130 displayed on the display of the second device 102.

According to various embodiments, the second device 102 may terminate the display of the visual information 130 when the specified time (e.g., 5 seconds) elapses after displaying the visual information 130. In this case, the second device 102 may be switched to a previous state (e.g., the screen-locked state) before displaying the visual information 130. The information associated with the output visual information 130 may be stored in the history of the voice recognition application.

Figure 11:
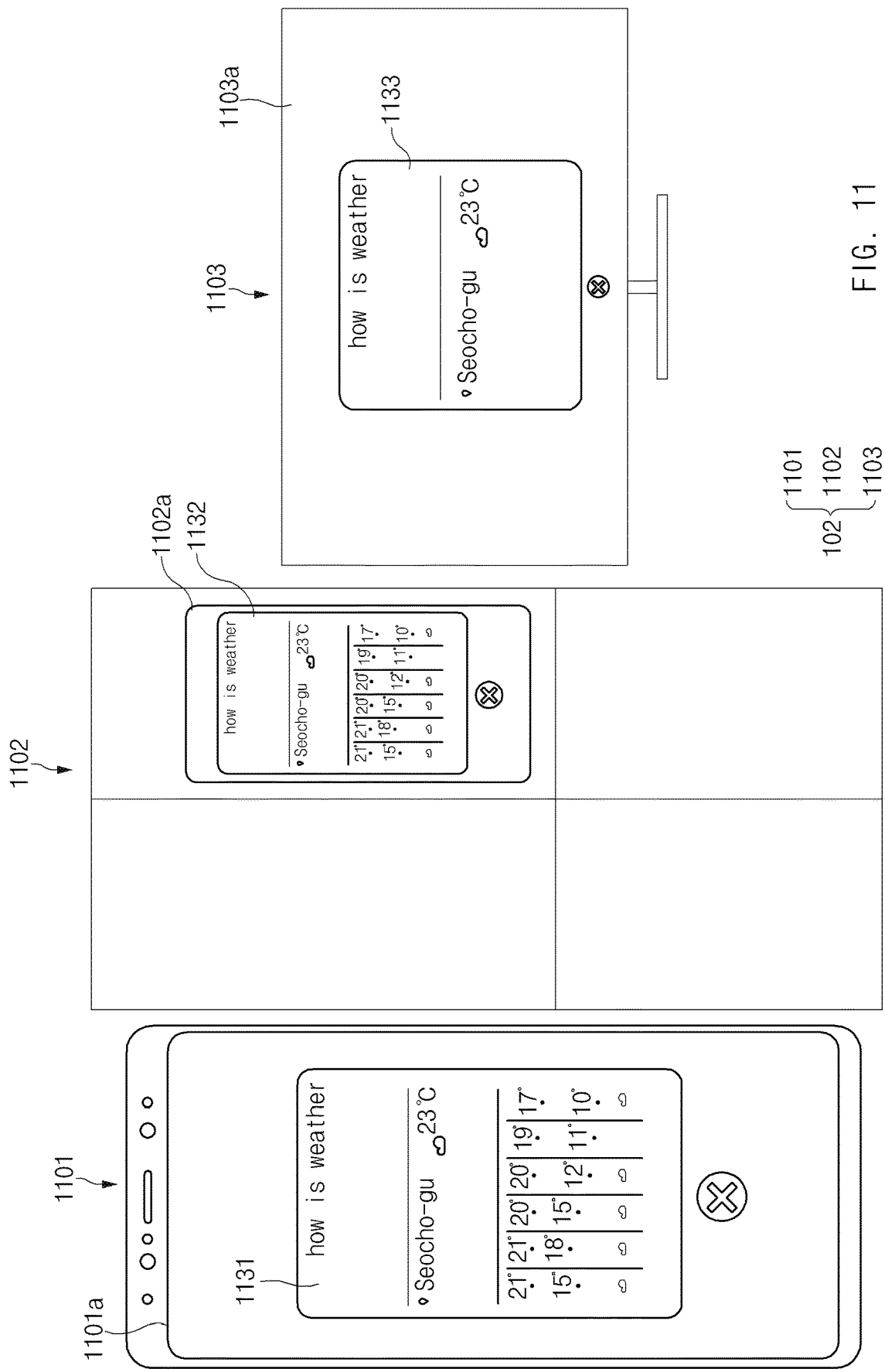
FIG. 11 is a diagram illustrating an example of displaying visual information based on a type of a second device according to various embodiments.

FIG. 11 is a diagram illustrating an example of displaying visual information based on a type of a second device according to various embodiments. FIG. 11 is illustrative, and the disclosure is not limited thereto.

Referring to FIG. 11, the second device 102 may be the device including the display. When the preset user interaction occurs, the second device 102 may display the visual information 130 associated with the voice response 120 being output from the first device 101. The user may more easily identify the information, which is not identified or is missed through the voice response 120 output through the speaker from the first device 101, through the visual information 130 displayed on the display of the second device 102.

According to an example embodiment, the second device 102 may be a personal device (e.g., smartphone and tablet PC) 1101 set by one specified user account. The personal device 1101 may detect a specified user interaction. For example, the interaction may be variously set, such as an operation, by the user, of lifting the personal device 1101, iris recognition fingerprint recognition, a multi-touch input, a slide input, and a voice input. When detecting the user interaction, the personal device 1101 may display visual information 1131 associated with the voice response 120 being output from the first device 101 on a display 1101*a*. The visual information 1131 may be a popup form displayed in a current screen state.

According to another embodiment, the second device 102 may be a shared device (e.g., a refrigerator) 1102 used by several people. The shared device 1102 may include a display 1102*a*, and may detect a specified user interaction. For example, the interaction may be set variously, such as a tap input, a multi-touch input, a slide input, and a voice input. The shared device 1102 may display visual information 1132 associated with the voice response 120 being output from the first device 101 on the display 1102a. In an example embodiment, the shared device 1102 may display the visual information 1132 after performing the user authentication process (e.g., password input and pattern input) based on an attribute of the visual information 130 (see FIG. 15).

According to another embodiment, the second device 102 may be a shared device (e.g., TV) 1103 used with accessories. The shared device 1103 used with the accessories may include a display 1103a, and may detect a specified user interaction. For example, the interaction may be set variously, such as an operation of lifting an accessory device (e.g., remote controller), an input of pressing a specific button of the accessory device, a tap input, a multi-touch input, a slide input, and a voice input to the display. When detecting the interaction, the shared device 1103 may display visual information 1133 associated with the voice response 120 being output from the first device 101 on a display 1103a.

Figure 12:
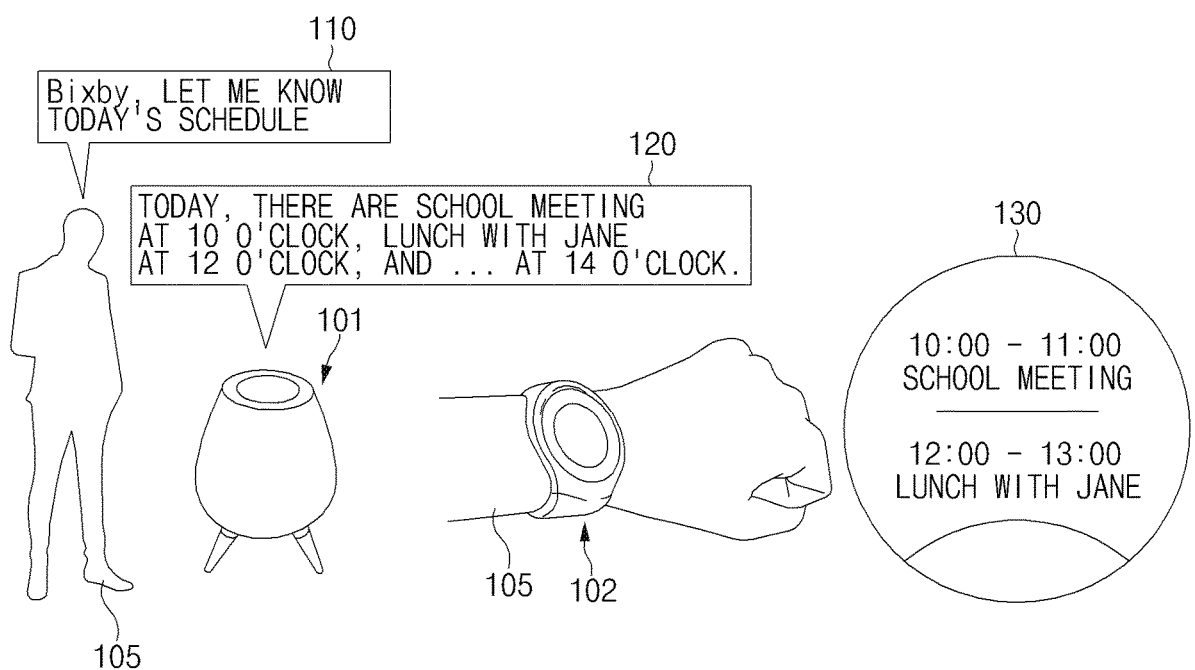
FIG. 12 is a diagram illustrating example user interaction when a second device according to various embodiments is a wearable device.

FIG. 12 is a diagram illustrating example user interaction when a second device according to various embodiments is a wearable device. FIG. 12 illustrates an example case in which the second device is the smart watch, but the second device is not limited thereto.

Referring to FIG. 12, the second device 102 may be a wearable device including a display. The second device 102 may be worn on a user's body, and may recognize the operation of the user through the various sensors. When the first device 101 is outputting the voice response 120 corresponding to the utterance input 110 of the user 105, the second device 102 may detect whether the preset user interaction occurs. For example, the user interaction may be an operation, by the user, of lifting or shaking the wrist, which is wearing the second device 102.

When detecting the user interaction, the second device 102 may display the visual information 130 associated with the voice response 120 being output from the first device 101 on the display.

The user may more easily identify the information, which is not identified or is missed through the voice response 120 output through the speaker from the first device 101, through the visual information 130 displayed on the display of the second device 102.

Figure 13:
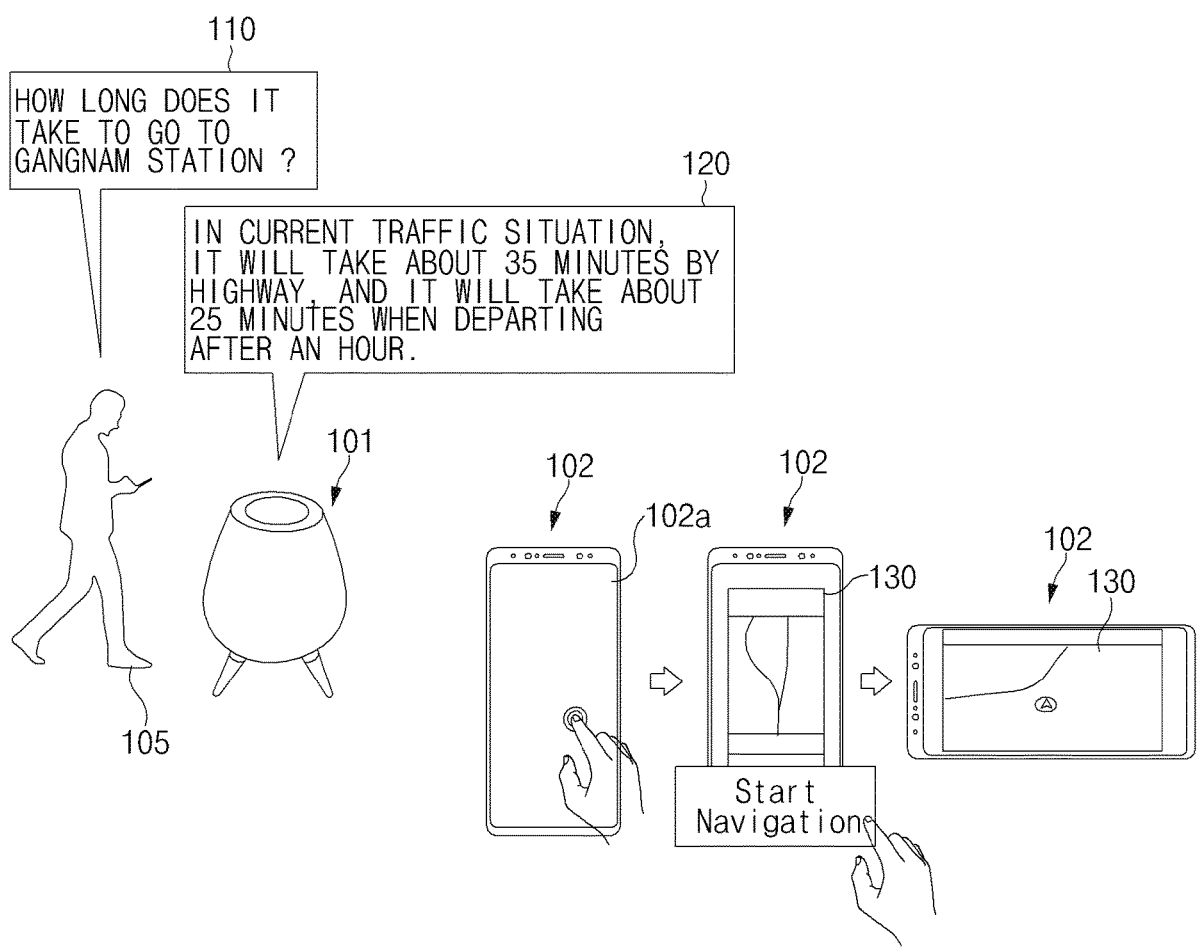
FIG. 13 is a diagram illustrating an example display of visual information through execution of an application other than a voice recognition application according to various embodiments.

FIG. 13 is a diagram illustrating example display of visual information through execution of an application other than a voice recognition application according to various embodiments. FIG. 13 illustrates an example map app, but the disclosure is not limited thereto.

Referring to FIG. 13, the first device 101 may output the voice response 120 in response to the utterance input 110 of the user. For example, when the user asks a way from the house to a Gangnam station, the first device 101 may output a process of going from the house to the Gangnam station through the speaker as a voice.

When the first device 101 is in the voice outputting state, the second device 102 may determine whether the preset user interaction (e.g., tap input) occurs. When the user interaction (e.g., tap input) occurs, the second device 102 may display the visual information 130 associated with the voice response 120 being output from the first device 101. The second device 102 may display the visual information 130 by executing an application other than the voice recognition application (e.g., a map app). For example, the visual information 130 may be an image indicating a route from a current location of the user 105 to the Gangnam station.

The second device 102 may request the visual information 130 from the server 103. The server 103 may transmit information about an execution scheme or an execution state of the specified application (e.g., map app) to the second device 102. The second device 102 may execute the specified application (e.g., map app) based on the execution scheme or execution state. For example, the second device 102 may execute the map app based on information about departure point/destination/transportation received from the server 103. The second device 102 may execute the map app in a state of displaying a route from the departure point to the destination using a specified transportation.

Figure 14:
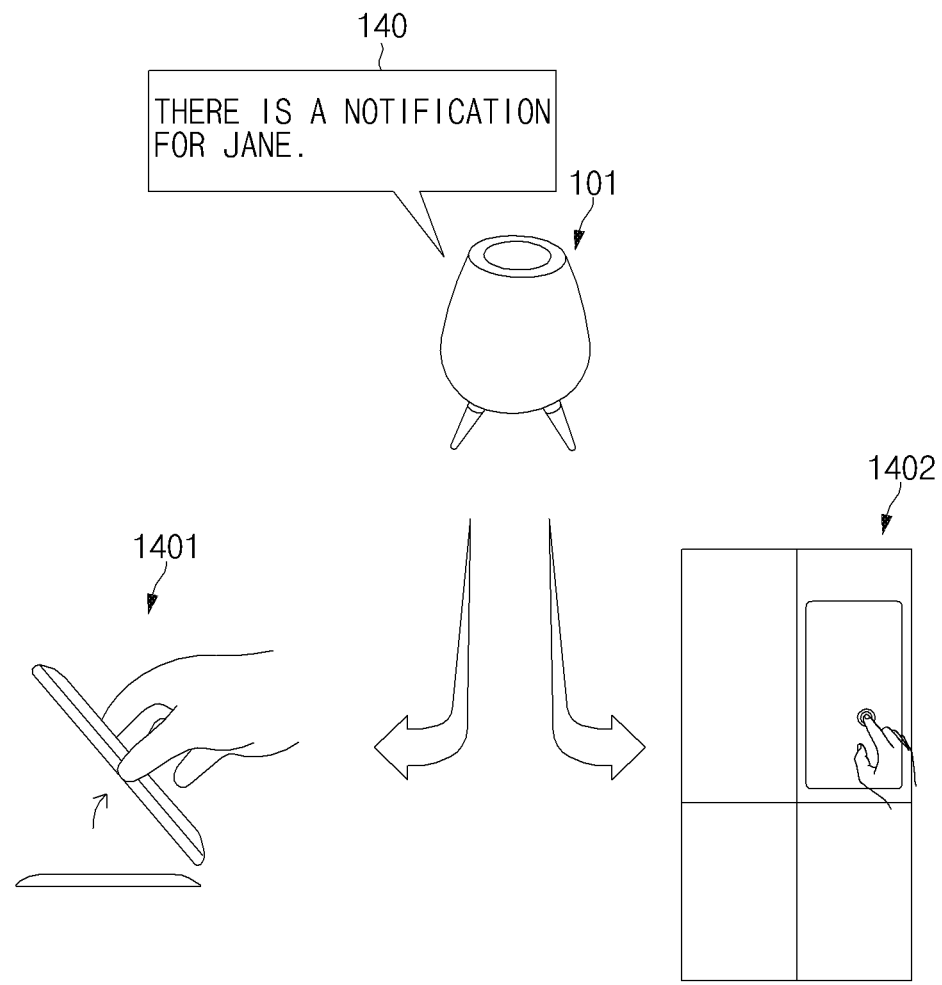
FIG. 14 is a diagram illustrating an example process in response to event notification from a first device according to various embodiments.

FIG. 14 is a diagram illustrating an example process in response to event notification from a first device according to various embodiments. FIG. 14 illustrates an example case of receiving a message, but the disclosure is not limited thereto.

Referring to FIG. 14, when a specified event occurs, the first device 101 may output a voice notification 140 (e.g., There is a notification for Jane) associated with the event. For example, the event may be an event requiring a user notification, such as receiving a message, receiving an email, receiving a call for a voice call/video call, when an alarm time has come, or when a stored schedule time has come. When outputting the voice notification 140, the first device 101 may transmit the signal indicating that the first device 101 is in the voice outputting state to the second device 102 or the server 103.

When receiving the signal from the first device 101 or the server 103, second devices 1401 and 1402 may detect occurrence of specified user interactions, respectively.

According to various embodiments, the personal device 1401 may be a device (e.g., smartphone and tablet PC) set by one specified user account. The personal device 1401 may detect the specified user interaction. The interaction may be variously set, such as an operation of lifting the personal device 1401 by the user, iris recognition, fingerprint recognition, multi-touch input, slide input, and voice input. When the personal device 1401 detects the user interaction, the personal device 1401 may display specific information of a notification response 140 being output from the first device 101 on the display. The personal device 1401 may display a specific content of the notification (e.g., Jane, where shall we meet in the evening?).

According to various embodiments, the shared device 1402 may be a device (e.g., refrigerator and TV) that may be set by a plurality of user accounts. The shared device 1402 may detect the specified user interaction. The interaction may be set variously, such as a tap input, a multi-touch input, a slide input, and a voice input. The shared device 1402 may display visual information associated with the notification response 140 being output from the first device 101 on the display. In an example embodiment, the shared device 1402 may display visual information 130 after performing a user authentication process (e.g., password input and pattern input) depending on an attribute of the visual information. For example, when the visual information is a privacy attribute, the shared device 1402 may perform the user authentication by performing the pattern input, and then display the specific content of the notification (e.g., Jane, where shall we meet in the evening?) for the authenticated user.

Figure 15:
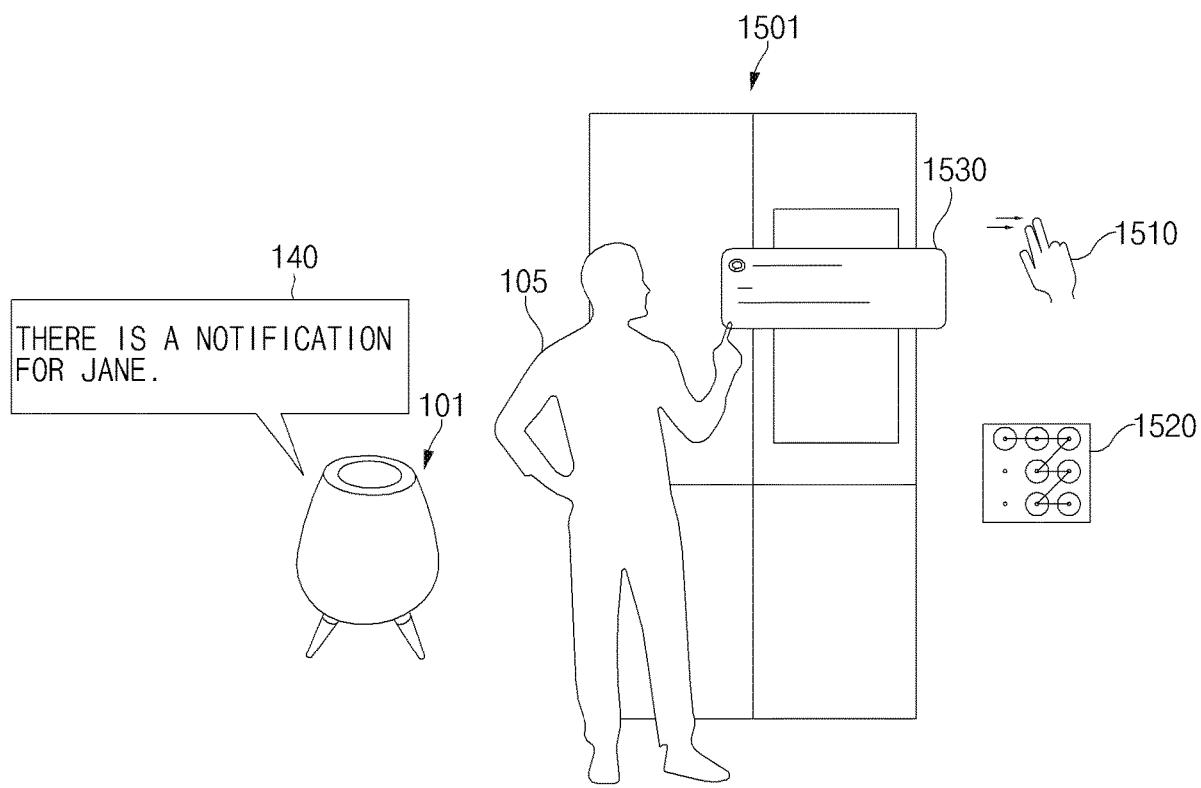
FIG. 15 is a diagram illustrating example user authentication performed at a shared device according to various embodiments.

FIG. 15 is a diagram illustrating example user authentication performed at a shared device according to various embodiments.

Referring to FIG. 15, when a specified event occurs, the first device 101 may output the voice notification 140 (e.g., There is a notification for Jane) associated with the event. For example, the event may be an event requiring a user notification, such as receiving a message, receiving an email, receiving a call for a voice call/video call, when an alarm time has come, or when a stored schedule time has come. When outputting the voice notification 140, the first device 101 may transmit the signal indicating that the first device 101 is in the voice outputting state to the second device 102 or the server 103.

When receiving the signal from the first device 101 or the server 103, a second device 1501 may detect occurrence of a specified user interaction 1510. The second device 1501 may be a shared device (e.g., refrigerator) that may be set by a plurality of user accounts. The second device 1501 may sense the specified user interaction 1510 (e.g., slide input). The second device 1501 may identify an attribute of visual information 1530 (or an attribute of the voice notification 140). The attribute of visual information 1530 may be stored by user setting or basic setting. For example, the visual information 1530 associated with message reception and email reception notification may be set as a privacy attribute by a separate user input.

When the property of the visual information is the privacy property, the second device 1501 may display an interface 1520 for user authentication. When the user authentication is completed, the second device 1501 may display the visual information 1530 (e.g., Jane, where shall we meet in the evening?) on the display.

Figure 16:
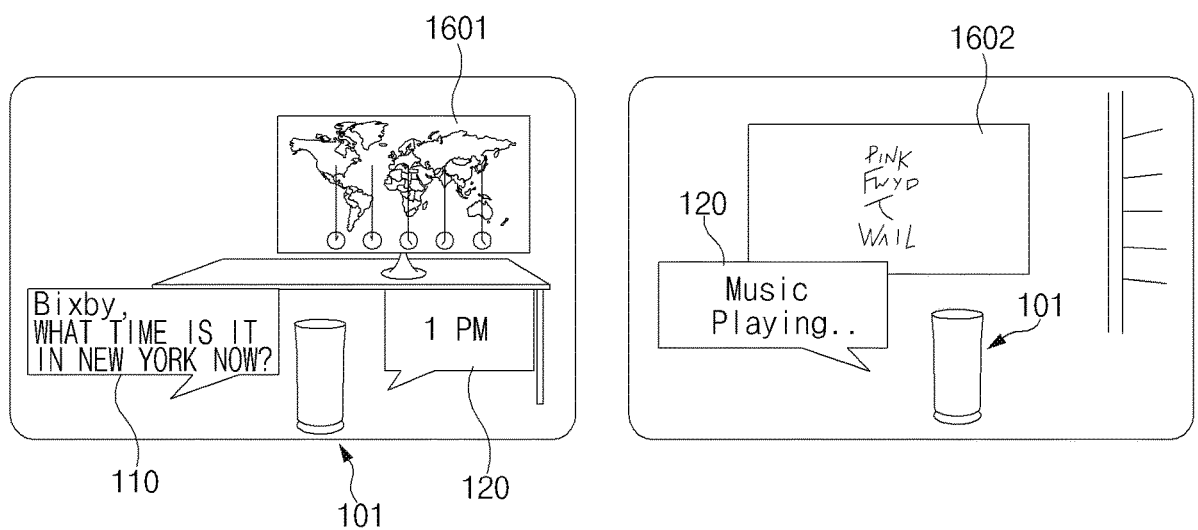
FIG. 16 is diagram illustrating an example screen displaying an image associated with a voice response in a second device according to various embodiments.

FIG. 16 is a diagram illustrating an example of a screen displaying an image associated with a voice response in a second device according to various embodiments. FIG. 16 is illustrative, and the disclosure is not limited thereto.

Referring to FIG. 16, the first device 101 may output the voice response 120 in response to the utterance input 110 of the user. When outputting the voice response 120, the first device 101 may transmit the signal indicating that the first device 101 is in the voice outputting state to the second device 102 or the server 103.

Second devices 1601 and 1602 may be devices having displays, respectively. When a preset user interaction occurs, the second devices 1601 and 1602 may display visual information (or a background image) associated with an attribute of the voice response 120 being output from the first device 101.

For example, the first device 101 may output the voice response 120 (e.g., 1 PM) corresponding to the user's utterance input 110 (e.g., What time is it New York now?). The second device 1601 may receive the attribute (e.g., world time) of the voice response 120 from the first device 101 or the server 103, and then display the visual information (e.g., an image representing a current time of each region of the world) corresponding to the attribute (e.g., world time) of the voice response 120.

As another example, the first device 101 may output the voice response 120 corresponding to the user's utterance input (e.g., Turn on the music) or execute an associated application (e.g., a music app). The second device 1602 may receive the attribute of the voice response 120 or an attribute about the application being executed (e.g., music playback) from the first device 101 or the server 103, and display visual information (e.g., an album image being played) corresponding to the attribute (e.g., music playback).

Figure 17:
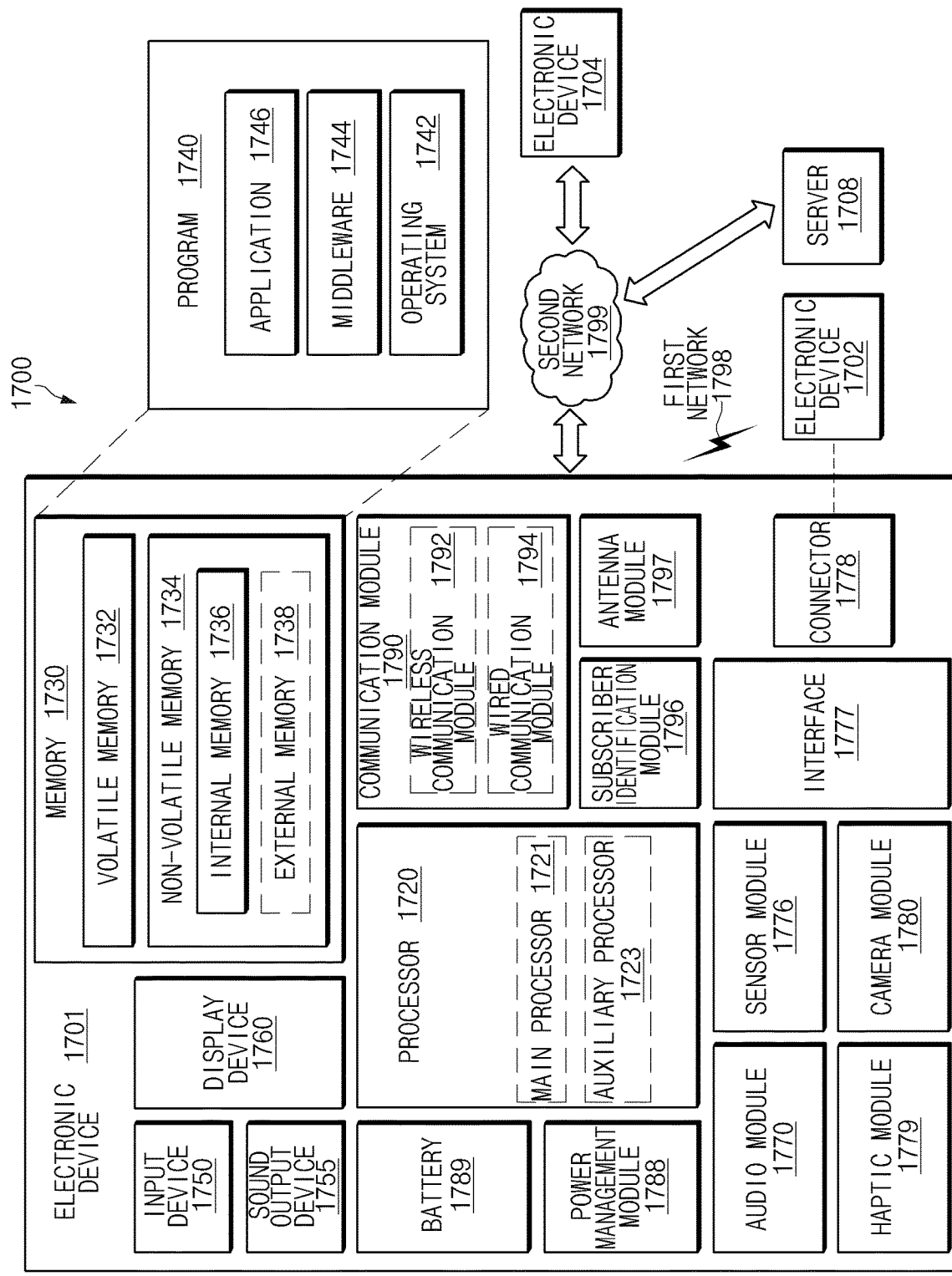
FIG. 17 is a block diagram illustrating an example electronic device in a network environment according to various embodiments.

FIG. 17 is a block diagram illustrating an example electronic device 1701 in a network environment 1700 according to various embodiments. An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, personal digital assistant (PDA), a portable multimedia player (PMP), a Motion Picture Experts Group (MPEG-1 or MPEG-2) Audio Layer 3 (MP3) player, a mobile medical device, a camera, or a wearable device. According to various embodiments, a wearable device may include at least one of an accessory type of device (e.g., a timepiece, a ring, a bracelet, an anklet, a necklace, glasses, a contact lens, or a head-mounted device (HMD)), a one-piece fabric or clothes type of device (e.g., electronic clothes), a body-attached type of device (e.g., a skin pad or a tattoo), or a bio-implantable type of device (e.g., implantable circuit). According to various embodiments, the electronic device may include at least one of, for example, televisions (TVs), digital versatile disk (DVD) players, audios, audio accessory devices (e.g., speakers, headphones, or headsets), refrigerators, air conditioners, cleaners, ovens, microwave ovens, washing machines, air cleaners, set-top boxes, home automation control panels, security control panels, game consoles, electronic dictionaries, electronic keys, camcorders, electronic picture frames, or the like, but is not limited thereto.

In another embodiment, the electronic device may include at least one of navigation devices, satellite navigation system (e.g., Global Navigation Satellite System (GNSS)), event data recorders (EDRs) (e.g., black box for a car, a ship, or a plane), vehicle infotainment devices (e.g., head-up display for vehicle), industrial or home robots, drones, automatic teller's machines (ATMs), points of sales (POSs), measuring instruments (e.g., water meters, electricity meters, or gas meters), internet of things (e.g., light bulbs, sprinkler devices, fire alarms, thermostats, or street lamps), or the like. The electronic device according to an embodiment of this disclosure may not be limited to the above-described devices, and may provide functions of a plurality of devices like smartphones which has measurement function of personal biometric information (e.g., heart rate or blood glucose). In this disclosure, the term "user" may refer to a person who uses an electronic device or may refer to a device (e.g., an artificial intelligence electronic device) that uses the electronic device.

Referring to FIG. 17, the electronic device 1701 may communicate with an electronic device 1702 through a first network 1798 or may communicate with an electronic device 1704 or a server 1704 through a second network 1799 in a network environment 1700. According to an embodiment, the electronic device 1701 may communicate with the electronic device 1702 through the server 1708.

Referring to FIG. 17, the electronic device 1701 may communicate with an electronic device 1702 through a first network 1798 (e.g., a short-range wireless communication network) or may communicate with an electronic device 1704 or a server 1708 through a second network 1799 (e.g., a long-distance wireless communication network) in a network environment 1700. According to an embodiment, the electronic device 1701 may communicate with the electronic device 1704 through the server 1708. According to an embodiment, the electronic device 1701 may include a processor 1720, a memory 1730, an input device 1750, a sound output device 1755, a display device 1760, an audio module 1770, a sensor module 1776, an interface 1777, a haptic module 1779, a camera module 1780, a power management module 1788, a battery 1789, a communication module 1790, a subscriber identification module 1796, or an antenna module 1797. According to some embodiments, at least one (e.g., the display device 1760 or the camera module 1780) among components of the electronic device 1701 may be omitted or one or more other components may be added to the electronic device 1701. According to some embodiments, some of the above components may be implemented with one integrated circuit. For example, the sensor module 1776 (e.g., a fingerprint sensor, an iris sensor, or an illuminance sensor) may be embedded in the display device 1760 (e.g., a display).

The processor 1720 may execute, for example, software (e.g., a program 1740) to control at least one of other components (e.g., a hardware or software component) of the electronic device 1701 connected to the processor 1720 and may process or compute a variety of data. According to an embodiment, as a part of data processing or operation, the processor 1720 may load a command set or data, which is received from other components (e.g., the sensor module 1776 or the communication module 1790), into a volatile memory 1732, may process the command or data loaded into the volatile memory 1732, and may store result data into a nonvolatile memory 1734. According to an embodiment, the processor 1720 may include a main processor 1721 (e.g., a central processing unit or an application processor) and an auxiliary processor 1723 (e.g., a graphic processing device, an image signal processor, a sensor hub processor, or a communication processor), which operates independently from the main processor 1721 or with the main processor 1721. Additionally or alternatively, the auxiliary processor 1723 may use less power than the main processor 1721, or is specified to a designated function. The auxiliary processor 1723 may be implemented separately from the main processor 1721 or as a part thereof.

The auxiliary processor 1723 may control, for example, at least some of functions or states associated with at least one component (e.g., the display device 1760, the sensor module 1776, or the communication module 1790) among the components of the electronic device 1701 instead of the main processor 1721 while the main processor 1721 is in an inactive (e.g., sleep) state or together with the main processor 1721 while the main processor 1721 is in an active (e.g., an application execution) state. According to an embodiment, the auxiliary processor 1723 (e.g., the image signal processor or the communication processor) may be implemented as a part of another component (e.g., the camera module 1780 or the communication module 1790) that is functionally related to the auxiliary processor 1723.

The memory 1730 may store a variety of data used by at least one component (e.g., the processor 1720 or the sensor module 1776) of the electronic device 1701. For example, data may include software (e.g., the program 1740) and input data or output data with respect to commands associated with the software. The memory 1730 may include the volatile memory 1732 or the nonvolatile memory 1734. The nonvolatile memory 1734 may include an internal memory 1736 and an external memory 1738.

The program 1740 may be stored in the memory 1730 as software and may include, for example, a kernel 1742, a middleware 1744, or an application 1746.

The input device 1750 may receive a command or data, which is used for a component (e.g., the processor 1720) of the electronic device 1701, from an outside (e.g., a user) of the electronic device 1701. The input device 1750 may include, for example, a microphone, a mouse, a keyboard, or a digital pen (e.g., a stylus pen).

The sound output device 1755 may output a sound signal to the outside of the electronic device 1701. The sound output device 1755 may include, for example, a speaker or a receiver. The speaker may be used for general purposes, such as multimedia play or recordings play, and the receiver may be used for receiving calls. According to an embodiment, the receiver and the speaker may be either integrally or separately implemented.

The display device 1760 may visually provide information to the outside (e.g., the user) of the electronic device 1701. For example, the display device 1760 may include a display, a hologram device, or a projector and a control circuit for controlling a corresponding device. According to an embodiment, the display device 1760 may include a touch circuitry configured to sense the touch or a sensor circuit (e.g., a pressure sensor) for measuring an intensity of pressure on the touch.

The audio module 1770 may convert a sound and an electrical signal in dual directions. According to an embodiment, the audio module 1770 may obtain the sound through the input device 1750 or may output the sound through the sound output device 1755 or an external electronic device (e.g., the electronic device 1702 (e.g., a speaker or a headphone)) directly or wirelessly connected to the electronic device 1701.

The sensor module 1776 may generate an electrical signal or a data value corresponding to an operating state (e.g., power or temperature) inside or an environmental state (e.g., a user state) outside the electronic device 1701. According to an embodiment, the sensor module 1776 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1777 may support one or more designated protocols to allow the electronic device 1701 to connect directly or wirelessly to the external electronic device (e.g., the electronic device 1702). According to an embodiment, the interface 1777 may include, for example, an HDMI (high-definition multimedia interface), a USB (universal serial bus) interface, an SD card interface, or an audio interface.

A connecting terminal 1778 may include a connector that physically connects the electronic device 1701 to the external electronic device (e.g., the electronic device 1702). According to an embodiment, the connecting terminal 1778 may include, for example, an HDMI connector, a USB connector, an SD card connector, or an audio connector (e.g., a headphone connector).

The haptic module 1779 may convert an electrical signal to a mechanical stimulation (e.g., vibration or movement) or an electrical stimulation perceived by the user through tactile or kinesthetic sensations. According to an embodiment, the haptic module 1779 may include, for example, a motor, a piezoelectric element, or an electric stimulator.

The camera module 1780 may shoot a still image or a video image. According to an embodiment, the camera module 1780 may include, for example, at least one or more lenses, image sensors, image signal processors, or flashes.

The power management module 1788 may manage power supplied to the electronic device 1701. According to an embodiment, the power management module 1788 may be implemented as at least a part of a power management integrated circuit (PMIC).

The battery 1789 may supply power to at least one component of the electronic device 1701. According to an embodiment, the battery 1789 may include, for example, a non-rechargeable (primary) battery, a rechargeable (secondary) battery, or a fuel cell.

The communication module 1790 may establish a direct (e.g., wired) or wireless communication channel between the electronic device 1701 and the external electronic device (e.g., the electronic device 1702, the electronic device 1704, or the server 1708) and support communication execution through the established communication channel. The communication module 1790 may include at least one communication processor operating independently from the processor 1720 (e.g., the application processor) and supporting the direct (e.g., wired) communication or the wireless communication. According to an embodiment, the communication module 1790 may include a wireless communication module (or a wireless communication circuit) 1792 (e.g., a cellular communication module, a short-range wireless communication module, or a GNSS (global navigation satellite system) communication module) or a wired communication module 1794 (e.g., an LAN (local area network) communication module or a power line communication module). The corresponding communication module among the above communication modules may communicate with the external electronic device through the first network 1798 (e.g., the short-range communication network such as a Bluetooth, a Wi-Fi direct, or an IrDA (infrared data association)) or the second network 1799 (e.g., the long-distance wireless communication network such as a cellular network, an internet, or a computer network (e.g., LAN or WAN)). The above-mentioned various communication modules may be implemented into one component (e.g., a single chip) or into separate components (e.g., chips), respectively. The wireless communication module 1792 may identify and authenticate the electronic device 1701 using user information (e.g., international mobile subscriber identity (IMSI)) stored in the subscriber identification module 1796 in the communication network, such as the first network 1798 or the second network 1799.

The antenna module 1797 may transmit or receive a signal or power to or from the outside (e.g., an external electronic device). According to an embodiment, the antenna module may include one antenna including a radiator made of a conductor or conductive pattern formed on a substrate (e.g., a PCB). According to an embodiment, the antenna module 1797 may include a plurality of antennas. In this case, for example, the communication module 1790 may select one antenna suitable for a communication method used in the communication network such as the first network 1798 or the second network 1799 from the plurality of antennas. The signal or power may be transmitted or received between the communication module 1790 and the external electronic device through the selected one antenna. According to some embodiments, in addition to the radiator, other parts (e.g., a RFIC) may be further formed as a portion of the antenna module 1797.

At least some components among the components may be connected to each other through a communication method (e.g., a bus, a GPIO (general purpose input and output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 1701 and the external electronic device 1704 through the server 1708 connected to the second network 1799. Each of the electronic devices 1702 and 1704 may be the same or different types as or from the electronic device 1701. According to an embodiment, all or some of the operations performed by the electronic device 1701 may be performed by one or more external electronic devices among the external electronic devices 1702, 1704, or 1708. For example, when the electronic device 1701 performs some functions or services automatically or by request from a user or another device, the electronic device 1701 may request one or more external electronic devices to perform at least some of the functions related to the functions or services, in addition to or instead of performing the functions or services by itself. The one or more external electronic devices receiving the request may carry out at least a part of the requested function or service or the additional function or service associated with the request and transmit the execution result to the electronic device 1701. The electronic device 1701 may provide the result as is or after additional processing as at least a part of the response to the request. To this end, for example, a cloud computing, distributed computing, or client-server computing technology may be used.

According to various example embodiments, an electronic device (e.g., the second device 102 of FIG. 1) may include a display, a communication interface comprising communication circuitry, a processor, and a memory operatively connected to the processor, wherein the memory may store instructions which, when executed, cause the processor to control the electronic device to: determine whether an external device (e.g., the first device 101 of FIG. 1) is outputting a voice response corresponding to an utterance input of a user, receive a specified user interaction, and allow visual information associated with the voice response to be displayed on the display (e.g., the display 102*a* of FIG. 1) in response to the user interaction.

According to various example embodiments, the instructions, when executed, may cause the processor (e.g., the processor 1720 of FIG. 17) to control the electronic device to define a channel by a short-range communication with the external device through the communication interface (e.g., the communication module 1790 of FIG. 17), and identify a state of the external device through the channel.

According to various example embodiments, the instructions may, when executed, cause the processor to control the electronic device to define a channel through the external device and a network device through the communication interface, and identify a state of the external device through the channel.

According to various example embodiments, the instructions may, when executed, cause the processor to control the electronic device to identify a state of the external device through an external server (e.g., the sever 103 of FIG. 1).

According to various example embodiments, the electronic device may further include a sensor (e.g., the sensor module 1776 of FIG. 17) configured to detect a state of the electronic device, wherein the instructions, when executed, may cause the processor to control the electronic device to determine that the user interaction occurred through the sensor based on a specified movement occurring in the electronic device.

According to various example embodiments, the instructions may cause the processor to determine that the user interaction occurred based on a touch input occurred on the display.

According to various embodiments, the instructions cause the processor to determine that the user interaction occurred when a specified user input occurred in an accessory device used in association with the electronic device or a specified movement occurred in the accessory device, According to an example embodiment, the visual information may include text corresponding to the voice response. According to another example embodiment, the visual information may include at least one of an image, an icon, and a user interface associated with the voice response.

According to various example embodiments, the instructions may, when executed, cause the processor to control the electronic device to request visual information from an external server, receive the visual information from the external server, and display the received visual information on the display.

According to various example embodiments, the instructions may, when executed, cause the processor to control the electronic device to perform user authentication based on an attribute of the visual information, and display the visual information when the user authentication is completed.

According to various example embodiments, the instructions, when executed, cause the processor to control the electronic device to execute a specified application, input information associated with the voice response into the application, and operate the application based on the input information to display the visual information.

According to various example embodiments, the instructions may, when executed, cause the processor to control the electronic device to change a content displayed on the display based on the voice response or the visual information.

An electronic device (e.g., the first device 101 of FIG. 1) according to various example embodiments may include a microphone, a speaker, a communication interface comprising communication circuitry, a processor, and a memory operatively connected to the processor, wherein the memory may store instructions which, when executed, cause the processor to control the electronic device to: receive a control signal associated with a voice output from an external device through an utterance input of a user through the microphone or through the communication interface, output a voice response corresponding to the utterance input or the control signal through the speaker, and transmit a state notification signal indicating a state associated with output of the voice response to the external device (e.g., the second device 102 or the server 103 of FIG. 1). The external device may be a device including a display or an external server.

According to various example embodiments, the instructions may, when executed, cause the processor to control the electronic device to transmit information associated with the voice response together with the state notification signal to the external device.

According to various example embodiments, the control signal may be a signal for allowing a specified notification to be output through the speaker.

According to various example embodiments, the electronic device (e.g., the first device 101 of FIG. 1) may further include a display having a resolution equal to or lower than a specified resolution.

According to various example embodiments, the instructions may, when executed, cause the processor to control the electronic device to identify a security attribute for the voice response, and transmit the security attribute together with the state notification signal to the external device.

A method for displaying information according to various example embodiments may be performed in an electronic device (e.g., the second device 102 of FIG. 1). The method may include determining whether an external device (e.g., the first device 101 of FIG. 1) is outputting a voice response corresponding to an utterance input of a user, receiving a specified user interaction; and displaying visual information associated with the voice response on a display (e.g., the display 102a of FIG. 1) in response to the user interaction.

The electronic device according to various example embodiments disclosed in the disclosure may display the visual information associated with the voice response output through the separate speaker on the display, so that the user may easily recognize the voice response.

The electronic device according to various example embodiments disclosed in the disclosure may display the visual information in which the additional information is added to the voice response being output by the separate speaker on the display.

The electronic device according to various example embodiments disclosed in the disclosure may execute the application associated with the voice response being output by the separate speaker directly in a specified state.

While the disclosure has been illustrated and described with reference to various example embodiments thereof, it will be understood by those skilled in the art that various changes in form and details may be made therein without departing from the spirit and scope of the disclosure, including the appended claims and their equivalents.

What is claimed is:

1. An electronic device comprising:
   a display;
   a communication interface comprising communication circuitry configured to perform wireless communication with an external device;
   a processor; and
   a memory operatively connected to the processor, wherein the memory is configured to store instructions that, when executed, cause the processor to control the electronic device to:
   determine whether the external device is outputting a voice response corresponding to an utterance input of a user;
   receive a specified user interaction after determining that the external device is outputting the voice response; and
   display visual information associated with the voice response output by the external device on the display in response to the user interaction.

2. The electronic device of claim 1, wherein the instructions, when executed, cause the processor to control the electronic device to:
   define a channel using a short-range communication with the external device through the communication interface; and
   identify a state of the external device through the channel.

3. The electronic device of claim 1, wherein the instructions, when executed, cause the processor to control the electronic device to:
   define a channel through the external device and a network device through the communication interface; and
   identify a state of the external device through the channel.

4. The electronic device of claim 1, wherein the instructions, when executed, cause the processor to control the electronic device to:
   identify a state of the external device through an external server.

5. The electronic device of claim 1, further comprising:
   a sensor configured to detect a state of the electronic device,
   wherein the instructions, when executed, cause the processor to control the electronic device to determine that the user interaction occurred through the sensor based on a specified movement occurring in the electronic device.

6. The electronic device of claim 1, wherein the instructions, when executed, cause the processor to control the electronic device to:
determine that the user interaction occurred based on a touch input occurring on the display.

7. The electronic device of claim 1, wherein the instructions, when executed, cause the processor to control the electronic device to:
determine that the user interaction occurred based on a specified user input occurring in an accessory device used in association with the electronic device or a specified movement occurring in the accessory device.

8. The electronic device of claim 1, wherein the visual information includes text corresponding to the voice response.

9. The electronic device of claim 1, wherein the visual information includes at least one of an image, an icon, and a user interface associated with the voice response.

10. The electronic device of claim 1, wherein the instructions, when executed, cause the processor to control the electronic device to:
request visual information from an external server;
receive the visual information from the external server; and
display the received visual information on the display.

11. The electronic device of claim 1, wherein the instructions, when executed, cause the processor to control the electronic device to:
perform user authentication based on an attribute of the visual information; and
display the visual information based on the user authentication being completed.

12. The electronic device of claim 1, wherein the instructions, when executed, cause the processor to control the electronic device to:
execute a specified application;
input information associated with the voice response into the application; and
operate the application based on the input information to display the visual information.

13. The electronic device of claim 1, wherein the instructions, when executed, cause the processor to control the electronic device to change a content displayed on the display based on the voice response or the visual information.

14. An electronic device comprising:
a microphone;
a speaker;
a communication interface comprising communication circuitry;
a processor; and
a memory operatively connected to the processor, wherein the memory is configured to store instructions that, when executed, cause the processor to control the electronic device to:
receive a control signal associated with a voice output from an external device through an utterance input of a user through the microphone or through the communication interface;
output a voice response corresponding to the utterance input or the control signal through the speaker; and
transmit a state notification signal indicating a state associated with output of the voice response and information associated with the output voice response to the external device.

15. The electronic device of claim 14, wherein the external device includes a display or an external server.

16. The electronic device of claim 14, wherein the control signal is a signal configured to allow a specified notification to be output through the speaker.

17. The electronic device of claim 14, further comprising:
a display having a resolution equal to or lower than a specified resolution.

18. The electronic device of claim 14, wherein the instructions, when executed, cause the processor to control the electronic device to:
identify a security attribute for the voice response; and
transmit the security attribute together with the state notification signal to the external device.

19. A method, performed in an electronic device, for displaying information, the method comprising:
determining whether an external device is outputting a voice response corresponding to an utterance input of a user;
receiving a specified user interaction after determining that the external device is outputting the voice response; and
displaying visual information associated with the voice response output by the external device on a display in response to the user interaction.

* * * * *